(12) United States Patent
Unagami et al.

(10) Patent No.: US 9,651,406 B2
(45) Date of Patent: May 16, 2017

(54) BATTERY-HISTORY INFORMATION MANAGEMENT APPARATUS, BATTERY-HISTORY INFORMATION MANAGEMENT METHOD, BATTERY-HISTORY INFORMATION MANAGEMENT SYSTEM, AND POWER STORAGE APPARATUS

(75) Inventors: Yuji Unagami, Osaka (JP); Natsume Matsuzaki, Osaka (JP); Motoji Ohmori, Osaka (JP); Hideki Matsushima, Osaka (JP); Yuichi Futa, Osaka (JP); Tomoyuki Haga, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1259 days.

(21) Appl. No.: 13/639,585

(22) PCT Filed: Mar. 21, 2012

(86) PCT No.: PCT/JP2012/001935
§ 371 (c)(1),
(2), (4) Date: Oct. 5, 2012

(87) PCT Pub. No.: WO2012/140835
PCT Pub. Date: Oct. 18, 2012

(65) Prior Publication Data
US 2013/0103355 A1    Apr. 25, 2013

(30) Foreign Application Priority Data
Apr. 15, 2011  (JP) ................................. 2011-091182

(51) Int. Cl.
*G06F 17/40* (2006.01)
*G01D 9/00* (2006.01)
(Continued)

(52) U.S. Cl.
CPC ................ *G01D 9/005* (2013.01); *B60L 3/12* (2013.01); *B60L 11/1838* (2013.01);
(Continued)

(58) Field of Classification Search
CPC .... Y02T 90/165; Y02T 90/164; Y02T 90/163
See application file for complete search history.

(56) References Cited

U.S. PATENT DOCUMENTS 6,239,579 B1  5/2001  Dunn et al.
2009/0234599 A1  9/2009  Watanabe
(Continued)

FOREIGN PATENT DOCUMENTS

EP   2 295 282    3/2011
JP   2009-219272   9/2009
(Continued)

OTHER PUBLICATIONS

International Search Report issued Apr. 24, 2012 in corresponding International Application No. PCT/JP2012/001935.
(Continued)

*Primary Examiner* — Aditya Bhat
(74) *Attorney, Agent, or Firm* — Wenderoth, Lind & Ponack, L.L.P.

(57) ABSTRACT

A battery history information management device for managing history information of a secondary battery includes: a connection determination unit which determines whether a charge/discharge device connected to the secondary battery is (i) a first charge/discharge device connected via a communication network to a server which manages the history information or (ii) a second charge/discharge device not connected to the server; a battery history recording unit which records, when it is determined that the charge/discharge device is the second charge/discharge device, charge/discharge history for second charge/discharge device into
(Continued)

battery history data; and a history upload control unit which transmits, when it is determined that the charge/discharge device is the first charge/discharge device, the battery history data to the server via the first charge/discharge device.

14 Claims, 12 Drawing Sheets

(51) Int. Cl.
  *H01M 10/42* (2006.01)
  *H02J 7/00* (2006.01)
  *B60L 11/18* (2006.01)
  *B60L 3/12* (2006.01)

(52) U.S. Cl.
  CPC ....... *B60L 11/1846* (2013.01); *B60L 11/1861* (2013.01); *H01M 10/42* (2013.01); *H02J 7/0021* (2013.01); *B60L 2240/622* (2013.01); *B60L 2240/70* (2013.01); *B60L 2240/80* (2013.01); *Y02T 10/7005* (2013.01); *Y02T 10/705* (2013.01); *Y02T 10/7044* (2013.01); *Y02T 10/7055* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(56) References Cited

U.S. PATENT DOCUMENTS

| 2009/0326749 A1* | 12/2009 | Uchida | G01R 31/3679 701/22 |
| 2010/0001687 A1* | 1/2010 | Watanabe | B60L 3/12 320/109 |
| 2010/0017249 A1* | 1/2010 | Fincham | B60L 3/12 705/412 |
| 2011/0066309 A1 | 3/2011 | Matsuoka et al. | |

FOREIGN PATENT DOCUMENTS

| JP | 2010-119209 | 5/2010 |
| JP | 2011-24293 | 2/2011 |
| JP | 2011-65752 | 3/2011 |
| WO | WO2010049779 | * 10/2009 |

OTHER PUBLICATIONS

Extended European Search Report issued Nov. 24, 2015 in corresponding European Application No. 12762186.0.

* cited by examiner

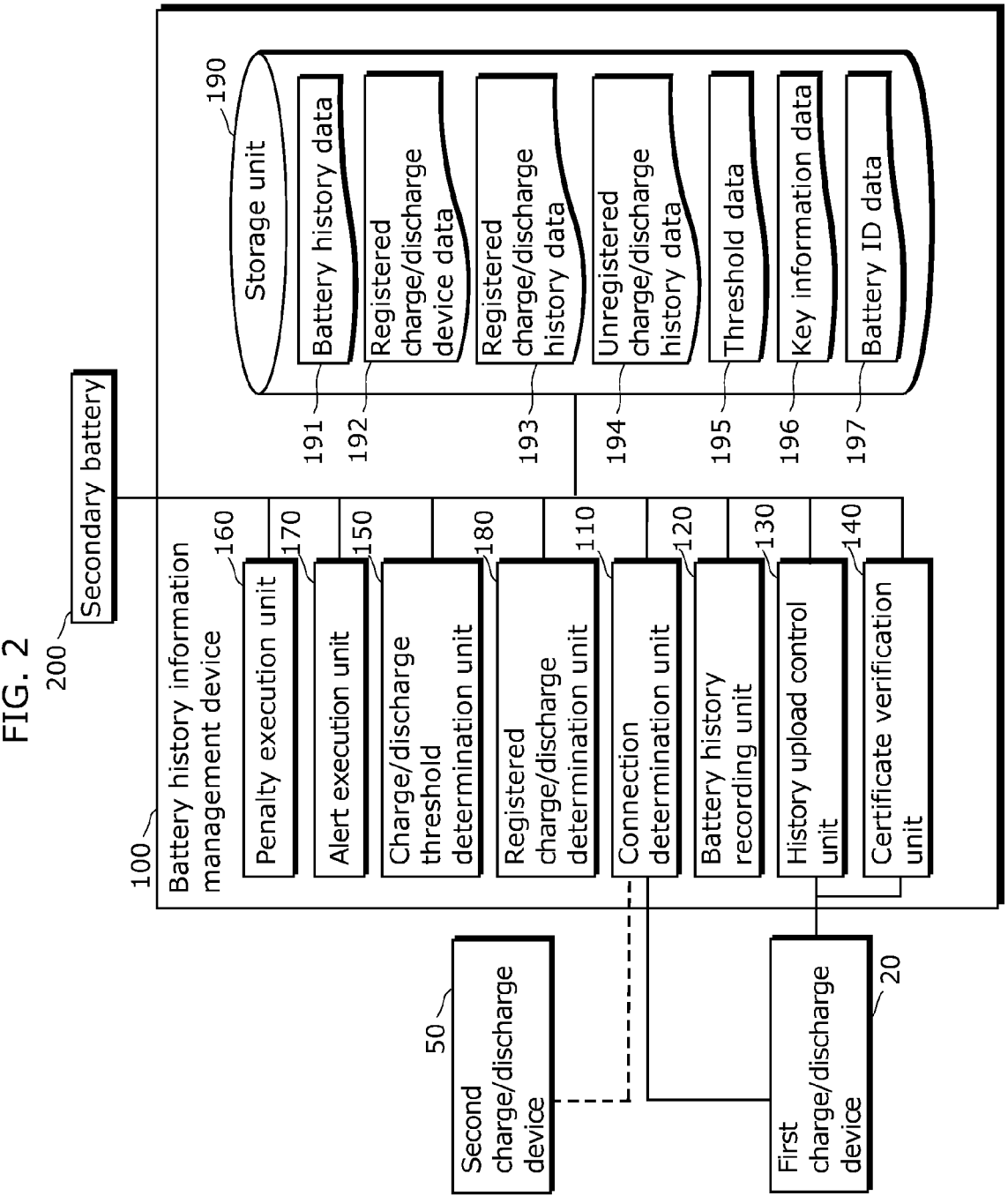

FIG. 3

| Time of day | Number of times of charge/discharge | Amount of charge/discharge | SOC | SOH | ... |
|---|---|---|---|---|---|
| T1 | +N1 | +P1 | C1 | H1 | |
| T2 | −N2 | −P2 | C2 | H2 | ... |
| T3 | −N3 | −P3 | C3 | H3 | |
| T4 | +N4 | +P4 | C4 | H4 | |
| ⋮ | ⋮ | ⋮ | ⋮ | ⋮ | ⋮ |

| Registered charge/discharge device | Registered charge/discharge device ID |
|---|---|
| Charge/discharge device 1 | G1 |
| Charge/discharge device 2 | G2 |
| ⋮ | ⋮ |

| Number of times of charge/discharge | Time of day of charge/discharge | Amount of charge/discharge | Registered charge/discharge device ID |
|---|---|---|---|
| +NA1 | TA1 | +PA1 | G1 |
| +NA2 | TA2 | +PA2 | G2 |
| −NA3 | TA3 | −PA3 | G3 |
| ⋮ | ⋮ | ⋮ | ⋮ |

| Number of times of charge/discharge | Time of day of charge/discharge | Amount of charge/discharge |
|---|---|---|
| +NB1 | TB1 | +PB1 |
| −NB2 | TB2 | −PB2 |
| +NB3 | TB3 | +PB3 |
| ⋮ | ⋮ | ⋮ |

| First threshold | S1 |
|---|---|
| Second threshold | S2 |

| Registered charge/discharge device | Position information |
|---|---|
| Charge/discharge device 1 | R1 |
| Charge/discharge device 2 | R2 |
| ⋮ | ⋮ |

FIG. 14

| Battery ID | Time of day | Place of charge/discharge | Number of times of charge/discharge | Amount of charge/discharge | SOC | SOH | ... |
|---|---|---|---|---|---|---|---|
| ID1 | T1 | Q1 | +N1 | +P1 | C1 | H1 | ... |
|  | T2 | Q2 | −N2 | −P2 | C2 | H2 | ... |
|  | T3 | Q3 | −N3 | −P3 | C3 | H3 | ... |
|  | T4 | Q4 | +N4 | +P4 | C4 | H4 | ... |
|  | ... | ... | ... | ... | ... | ... | ... |

191a

BATTERY-HISTORY INFORMATION MANAGEMENT APPARATUS, BATTERY-HISTORY INFORMATION MANAGEMENT METHOD, BATTERY-HISTORY INFORMATION MANAGEMENT SYSTEM, AND POWER STORAGE APPARATUS

TECHNICAL FIELD

The present invention relates to battery history information management devices, battery history information management methods, battery history information management systems, and power storage devices, for managing history information indicating history of charge or discharge performed on secondary batteries.

BACKGROUND ART

In recent years, secondary batteries are used for various purposes such as electric vehicles. The secondary batteries are very expensive, and therefore it is important to effectively utilize the secondary batteries by recognizing the state of deterioration of the secondary battery. In recognizing the state of deterioration of the secondary battery, it is required to manage history information indicating history of charge or discharge performed on the secondary battery.

Therefore, conventionally, a charge control device has been proposed which stores an event history when a charging event different from usual charging events happens (see Patent Literature (PTL) 1, for example). In this manner, by storing an event history, the history information of the secondary batteries can be managed.

CITATION LIST

Patent Literature

[PTL 1] Japanese Unexamined Patent Application Publication No. 2010-119209

SUMMARY OF INVENTION

Technical Problem

However, the above conventional device which manages history information of a secondary battery has a problem that the history information may be rewritten in an unauthorized manner. More specifically, while the conventional device is being used, the history information may be rewritten backward by adding or deleting the event information in an unauthorized manner. Since the state of deterioration of the secondary battery can be manipulated in the above manner, the state of deterioration of the secondary battery cannot be recognized correctly, which is an obstacle in an effective use of the secondary battery.

The present invention has been conceived to solve the above problem, and has an object to provide a battery history information management device, a battery history information management method, a battery history information management system, and a power storage device which can suppress unauthorized rewriting of history information of a secondary battery.

Solution to Problem

In order to achieve the above object, the battery history information management device according to an aspect of the present invention is a battery history information management device for managing history information indicating charge history or discharge history of a secondary battery, the device including: a connection determination unit configured to determine whether a charge/discharge device connected to the secondary battery for charging or discharging the secondary battery is a first charge/discharge device or a second charge/discharge device, the first charge/discharge device being connected via a communication network to a server which manages the history information, and the second charge/discharge device not being connected to the server; a battery history recording unit configured to record, when it is determined that the charge/discharge device is the second charge/discharge device, charge/discharge history into battery history data for recording the history information, the charge/discharge history being history of charge or discharge to or from the secondary battery performed by the second charge/discharge device; and a history upload control unit configured to transmit, when it is determined that the charge/discharge device is the first charge/discharge device, the battery history data recorded with the history information to the server via the first charge/discharge device.

With this, the battery history information management device: records, when the battery history information management device determines that the charge/discharge device connected to the secondary battery is not connected via the communication network to the server which manages the history information, the charge/discharge history into the battery history data; and transmits, when the battery history information management device determines that the charge/discharge device is connected to the server, the battery history data to the server via the charge/discharge device. In other words, the battery history information management device accumulates the charge/discharge history into a memory, when the charge or discharge is performed by the charge/discharge device not connected to the server. When the charge or discharge is performed using the charge/discharge device connected to the server, the battery history information management device transmits the accumulated charge/discharge history to the server. Thus, the charge/discharge history of the battery history information management device is managed at the server, whereby the charge/discharge history cannot be rewritten with ease. Therefore, the unauthorized rewriting of the history information of the secondary battery can be suppressed.

Furthermore, preferably, the history upload control unit is further configured to delete, from the battery history data stored in a storage unit, the history information recorded in the battery history data which the history upload control unit has transmitted to the server.

With this, the battery history information management device deletes, from the battery history data stored in the storage unit, the history information which the battery history information management device has transmitted to the server. In other words, the battery history information management device resets the history information which the battery history information management device has transmitted to the server, when uploading the battery history data to the server. Thus, an increase in the used capacity of the storage unit can be suppressed. Furthermore, since the history information is deleted from a memory of the battery history information management device, the history information cannot be rewritten even when the information in the memory is rewritten. Therefore, the unauthorized rewriting of the history information of the secondary battery can be suppressed, and furthermore, the increase of the used capacity of the memory can be suppressed.

Furthermore, preferably, the battery history information management device further includes a charge/discharge threshold determination unit configured to determine whether or not a charge/discharge integrated value exceeds a predetermined threshold, the charge/discharge integrated value being an integrated value of one of the following: the number of times of charge; the number of times of discharge; the number of times of charge-and-discharge; an amount of charge; an amount of discharge; and an amount of charge-and-discharge, for the secondary battery, which is indicated by the charge/discharge history, which is indicated by the charge/discharge history which is history of charge or discharge to or from the secondary battery performed by the second charge/discharge device recorded in the battery history data; and a penalty execution unit configured to execute, when it is determined that the charge/discharge integrated value exceeds the threshold, a penalty operation including limiting charging or discharging to or from the secondary battery or issuing an alert.

With this, when the battery history information management device determines that the charge/discharge integrated value in the charging or discharging using the charge/discharge device not connected to the server exceeds a predetermined threshold, the battery history information management device limits the charging or discharging of the secondary battery or issues an alert. The charge/discharge integrated value is one of the following: the number of times of charge; the number of times of discharge; the number of times of charge-and-discharge; an amount of charge; an amount of discharge; and an amount of charge-and-discharge, for the secondary battery. In other words, the battery history information management device encourages a user to charge or discharge using the charge/discharge device connected to the server, by imposing a penalty on the user, to suppress the charging or discharging using the charge/discharge device not connected to the server. Thus, the user charges or discharges using the charge/discharge device connected to the server, whereby the battery history information management device can transmit the accumulated charge/discharge history to the server. Therefore, the unauthorized rewriting of the history information of the secondary battery can be suppressed.

Furthermore, preferably, the penalty execution unit is configured to execute, when it is determined that the charge/discharge integrated value exceeds the threshold, the penalty operation at next charge or discharge to or from the secondary battery performed by the second charge/discharge device.

With this, the battery history information management device executes, when the battery history information management device determines that the charge/discharge integrated value of the secondary battery 200 exceeds the threshold, the penalty operation at next charging or discharging to or from the secondary battery. In other words, at the next charging or discharging, the battery history information management device encourages the user to charge or discharge using the charge/discharge device connected to the server. Thus, the user charges or discharges using the charge/discharge device connected to the server, whereby the battery history information management device can suppress the unauthorized rewriting of the history information of the secondary battery.

Furthermore, preferably, the battery history information management device further includes an alert execution unit configured to issue an alert when a difference between the charge/discharge integrated value and the threshold is smaller than or equal to a predetermined value.

With this, the battery history information management device issues an alert when a difference between the charge/discharge integrated value and the threshold is smaller than or equal to the predetermined value. In other words, when the charge/discharge integrated value is closer to the threshold, the battery history information management device encourages the user to charge or discharge using the charge/discharge device connected to the server. Thus, the user charges or discharges using the charge/discharge device connected to the server, whereby the battery history information management device can suppress the unauthorized rewriting of the history information of the secondary battery.

Furthermore, preferably, the charge/discharge threshold determination unit is configured to: increase the threshold when the history upload control unit transmits the battery history data to the server; and determine whether or not the charge/discharge integrated value exceeds the threshold increased.

With this, the battery history information management device increases the threshold for determining the charge/discharge integrated value, when the battery history information management device has transmitted the battery history data to the server. In other words, the battery history information management device provides the user with an incentive to upload the battery history data to the server. Thus, the user charges or discharges using the charge/discharge device connected to the server and upload the battery history data to the server, whereby the battery history information management device can suppress the unauthorized rewriting of the history information of the secondary battery.

Furthermore, preferably, the battery history information management device further includes: a storage unit configured to store registered charge/discharge device data indicating a registered charge/discharge device that is the second charge/discharge device previously registered; and a registered charge/discharge determination unit configured to determine, when it is determined that the charge/discharge device is the second charge/discharge device, whether the second charge/discharge device is the registered charge/discharge device or the unregistered charge/discharge device which is not the registered charge/discharge device, with reference to the registered charge/discharge device data, wherein the charge/discharge threshold determination unit is configured to: determine, when it is determined that the second charge/discharge device is the registered charge/discharge device, whether or not the charge/discharge integrated value for the registered charge/discharge device exceeds a predetermined first threshold; and determine, when it is determined that the second charge/discharge device is the unregistered charge/discharge device, whether or not the charge/discharge integrated value for the unregistered charge/discharge device exceeds a predetermined second threshold smaller than the first threshold, and the penalty execution unit is configured to execute the penalty operation (i) when it is determined that the charge/discharge integrated value for the registered charge/discharge device exceeds the first threshold or (ii) when it is determined that the charge/discharge integrated value which is the integrated value for the unregistered charge/discharge device exceeds the second threshold.

With this, the battery history information management device sets the first threshold to be greater than the second threshold, and executes the penalty operation. The first threshold is for determining the charge/discharge integrated value which is an integrated value of the charge or discharge performed by the registered charge/discharge device, and the second threshold is for determining the charge/discharge integrated value which is an integrated value of the charge or discharge performed by the unregistered charge/discharge device. Here, the registered charge/discharge device is a charge/discharge device which is preliminarily registered, such as a power socket at home, for example. In other words, the battery history information management device improves the convenience of the user by allowing a greater charge/discharge integrated value for charging or discharging using the registered charge/discharge device at home or the like than charging or discharging using the unregistered charge/discharge device. Therefore, the unauthorized rewriting of the history information of the secondary battery can be suppressed, and furthermore, the convenience of the user is improved.

Furthermore, preferably, the storage unit is configured to store registered charge/discharge history data and unregistered charge/discharge history data, the registered charge/discharge history data indicating the registered charge/discharge history which is history of charge or discharge to or from the secondary battery performed by the registered charge/discharge device, and the unregistered charge/discharge history data indicating the unregistered charge/discharge history which is history of charge or discharge to or from the secondary battery performed by the unregistered charge/discharge device, the registered charge/discharge determination unit is configured to: accumulate, when the registered charge/discharge determination unit determines that the second charge/discharge device is the registered charge/discharge device, history of charge or discharge to or from the secondary battery performed by the registered charge/discharge device, in the registered charge/discharge history data; and accumulate, when the registered charge/discharge determination unit determines that the second charge/discharge device is the unregistered charge/discharge device, history of charge or discharge to or from the secondary battery performed by the unregistered charge/discharge device, in the unregistered charge/discharge history data, and the charge/discharge threshold determination unit is configured to: determine whether or not the charge/discharge integrated value indicated by the registered charge/discharge history data exceeds the first threshold; and determine whether or not the charge/discharge integrated value indicated by the unregistered charge/discharge history data exceeds the second threshold.

With this, the battery history information management device: determines whether or not the charge/discharge integrated value indicated by the registered charge/discharge history data exceeds the first threshold; and determines whether or not the charge/discharge integrated value indicated by the unregistered charge/discharge history data exceeds the second threshold. In other words, the battery history information management device encourages the user to charge or discharge using the charge/discharge device connected to the server, by imposing a penalty on the user, to suppress the charging or discharging using the registered charge/discharge device which is not connected to the server or the unregistered charge/discharge device. Thus, the user charges or discharges using the charge/discharge device connected to the server, whereby the battery history information management device can transmit the accumulated charge/discharge history to the server. Therefore, the unauthorized rewriting of the history information of the secondary battery can be suppressed.

Furthermore, preferably, the storage unit is configured to store the registered charge/discharge device data including position information of the registered charge/discharge device, and the registered charge/discharge determination unit is configured to determine whether the second charge/discharge device is the registered charge/discharge device or the unregistered charge/discharge device, using the position information included in the registered charge/discharge device data and the position information of the secondary battery connected to the second charge/discharge device.

With this, the battery history information management device determines whether the charge/discharge device which is performing charge or discharge on the secondary battery is the registered charge/discharge device or the unregistered charge/discharge device, using the position information of the registered charge/discharge device and the position information of the secondary battery connected to the charge/discharge device. Thus, the determination can be easily made on whether or not the charge/discharge device performing charge or discharge on the secondary battery is the registered charge/discharge device, using the position information obtained by a global positioning system (GPS).

It is to be noted that the present invention can be achieved not only as the above battery history information management device, but also as a power storage device which includes a secondary battery and a battery history information management device for managing history information of the secondary battery. The present invention can also be achieved as a battery history information management system including a battery history information management device, a server which manages history information, and a charge/discharge device connected to the server via a communication network.

Furthermore, the present invention can also be achieved as a battery history information management method including a characteristic processing unit of the above battery history information management device as steps. Furthermore, the present invention can also be achieved as a program for causing a computer to execute the steps included in the battery history information management method, or as a computer-readable recording medium on which the program is recorded. It goes without saying that such a program can be distributed via a recording medium such as a CD-ROM or a transmission medium such as the Internet. Furthermore, the present invention can also be achieved as an integrated circuit including the characteristic processing unit included in the above battery history information management device.

Advantageous Effects of Invention

With the present invention, a battery history information management device which can suppress the unauthorized rewriting of the history information of the secondary battery can be provided.

BRIEF DESCRIPTION OF DRAWINGS

FIG. 2 is a block diagram showing a functional configuration of the battery history information management device according to the embodiment of the present invention.

FIG. 3 shows an example of battery history data according to the embodiment of the present invention.

FIG. 4 shows an example of registered charge/discharge device data according to the embodiment of the present invention.

FIG. 5 shows an example of registered charge/discharge history data according to the embodiment of the present invention.

FIG. 6 shows an example of unregistered charge/discharge history data according to the embodiment of the present invention.

FIG. 7 shows an example of threshold data according to the embodiment of the present invention.

FIG. 14 shows an example of battery history data according to Modification example 2 of the embodiment of the present invention.

DESCRIPTION OF EMBODIMENTS

Embodiment 1

The following describes the battery history information management device, the battery history information management system, and the power storage device according to the embodiment of the present invention, with reference to the drawings.

Figure 1:
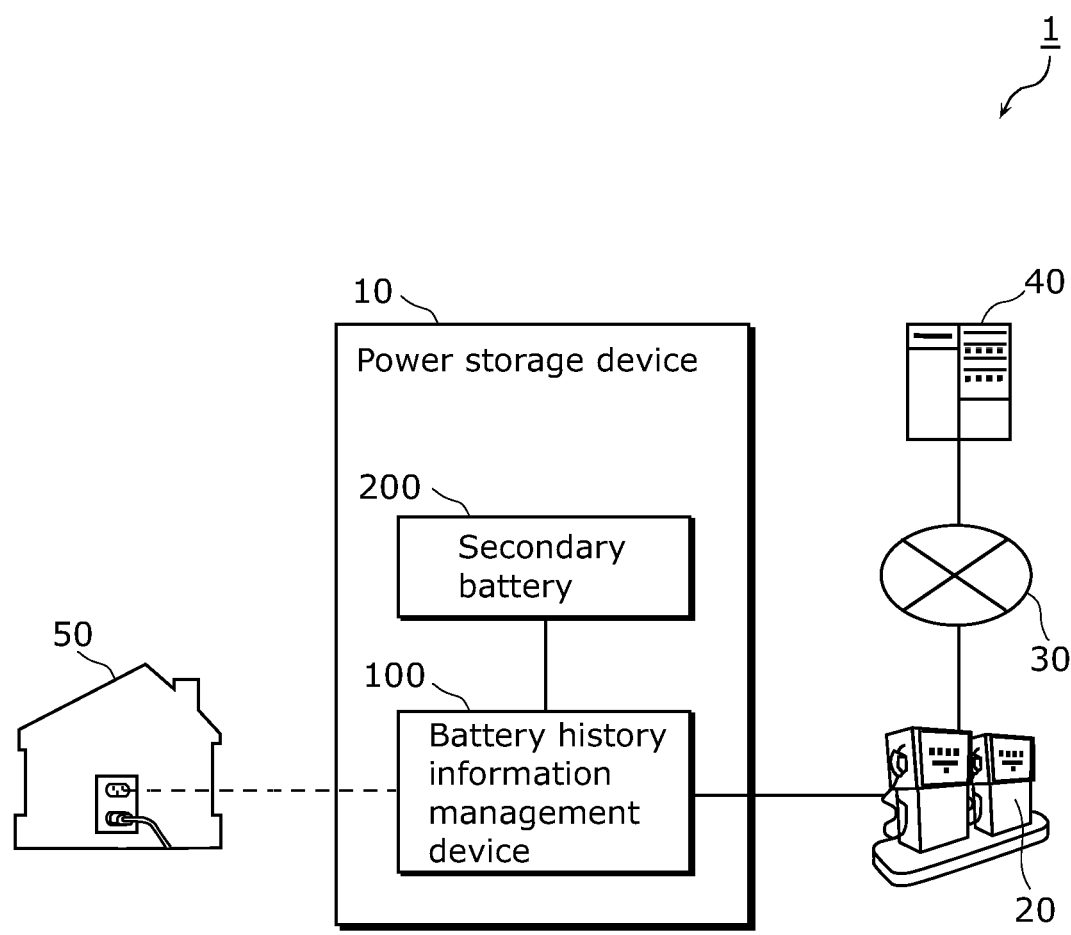
FIG. 1 shows a configuration of a battery history information management system including a power storage device having a battery history information management device according to an embodiment of the present invention.

FIG. 1 shows a configuration of a battery history information management system 1 including a power storage device 10 having a battery history information management device 100 according to the embodiment of the present invention.

As shown in FIG. 1, the battery history information management system 1 includes the power storage device 10, a first charge/discharge device 20, and a server 40.

The power storage device 10 includes the secondary battery 200, and the battery history information management device 100 for managing history information indicating charge history or discharge history of the secondary battery 200. Here, the power storage device 10 is a power storage device of an electric vehicle, and the secondary battery 200 is a non-aqueous electrolyte secondary battery such as a lithium-ion secondary battery, for example. Description is provided later on details of the battery history information management device 100.

The first charge/discharge device 20 is connected to the server 40 via a communication network 30, and is connected to the secondary battery 200 so that charge or discharge is performed on the secondary battery 200. Furthermore, the first charge/discharge device 20 transmits the history information of the secondary battery 200 to the server 40 according to an instruction from the battery history information management device 100.

Specifically, the first charge/discharge device 20 is: a station capable of charging and discharging; placed at public facilities such as a city hall or a public parking space; and connected to a communication network, for example. For example, the first charge/discharge device 20 can be achieved by connecting the communication network to the station at the time to set a new power controller at the public facilities.

The server 40 is a device which manages the history information of the secondary battery 200 transmitted from the first charge/discharge device 20. It is to be noted that the server 40 may be a computer dedicated for managing the history information, or a general-purpose computer.

Furthermore, connecting the secondary battery 200 via the battery history information management device 100 to the second charge/discharge device 50, instead of the first charge/discharge device 20, enables the power storage device 10 to charge or discharge the secondary battery 200. Here, the second charge/discharge device 50 is a charge/discharge device which is not connected to the server 40, and is a local facility such as a power socket at home or at a friend's house, for example.

It is to be noted that information for instructing to perform charging or discharging is transmitted and received between (i) the power storage device 10 and (ii) the first charge/discharge device 20 or the second charge/discharge device 50, so that the charging or discharging is performed on the power storage device 10 by the first charge/discharge device 20 or the second charge/discharge device 50. It is to be noted that the information is generated based on an input by the user, a state-of-charge of the power storage device 10, and the like.

The following describes the configuration of the battery history information management device 100 in detail.

FIG. 2 is a block diagram showing the functional configuration of the battery history information management device 100 according to the embodiment of the present invention.

The battery history information management device 100 is a device for managing the history information of the secondary battery 200. As shown in FIG. 2, the battery history information management device 100 includes a connection determination unit 110, a battery history recording unit 120, a history upload control unit 130, a certificate verification unit 140, a charge/discharge threshold determination unit 150, a penalty execution unit 160, an alert execution unit 170, a registered charge/discharge determination unit 180, and a storage unit 190. The storage unit 190 stores: battery history data 191; registered charge/discharge device data 192; registered charge/discharge history data 193; unregistered charge/discharge history data 194; threshold data 195; key information data 196; and battery ID data 197.

The connection determination unit 110 is configured to determine whether a charge/discharge device connected to the secondary battery 200 for charging or discharging the secondary battery 200 is a first charge/discharge device 20 or a second charge/discharge device 50, the first charge/discharge device 20 being connected via a communication network 30 to a server 40 which manages the history information of the secondary battery 200, and the second charge/discharge device 50 not being connected to the server 40.

The battery history recording unit 120 is configured to record, when the connection determination unit 110 determines that the charge/discharge device for charging or discharging the secondary battery 200 is the second charge/discharge device 50, charge/discharge history into battery history data 191 stored in the storage unit 190 for recording the history information, the charge/discharge history being history of charge or discharge to or from the secondary battery 200 performed by the second charge/discharge device 50.

The history upload control unit 130 is configured to transmit, when the connection determination unit 110 determines that the charge/discharge device for charging or discharging the secondary battery 200 is the first charge/discharge device 20, the battery history data 191 recorded with the history information of the secondary battery 200 to the server 40 via the first charge/discharge device 20. The history upload control unit 130 is further configured to delete, from the battery history data 191 stored in the storage unit 190, the history information recorded in the battery history data 191 which the history upload control unit 130 has transmitted to the server 40.

The certificate verification unit 140 receives from the server 40 a certificate for deleting the history information from the battery history data 191, and verifies the certificate. Then, when the certificate verification unit 140 verifies that the certificate is correct, the certificate verification unit 140 causes the history upload control unit 130 to delete the history information. It is to be noted that when the history information is uploaded, the server 40 issues a certificate for deleting the history information and transmits the certificate to the certificate verification unit 140.

The charge/discharge threshold determination unit 150 is configured to determine whether or not a charge/discharge integrated value exceeds a predetermined threshold, the charge/discharge integrated value being an integrated value of one of the following: the number of times of charge; the number of times of discharge; the number of times of charge-and-discharge; an amount of charge; an amount of discharge; and an amount of charge-and-discharge, for the secondary battery, which is indicated by the charge/discharge history which is history of charge or discharge to or from the secondary battery 200 performed by the second charge/discharge device 50 recorded in the battery history data 191. Furthermore, the charge/discharge threshold determination unit 150 is configured to: increase the threshold when the history upload control unit 130 transmits the battery history data 191 to the server 40; and determine whether or not the charge/discharge integrated value exceeds the threshold increased.

It is to be noted that the charge/discharge integrated value is, specifically, one of the following: an integrated value of the number of times of charge; an integrated value of the number of times of discharge; an integrated value of the number of times of charge-and-discharge; an integrated value of an amount of charge; an integrated value of an amount of discharge; and an integrated value of an absolute value of an amount of charge and an absolute value of an amount of discharge.

Specifically, the charge/discharge threshold determination unit 150 is configured to: determine, when it is determined that the second charge/discharge device 50 is the registered charge/discharge device, whether or not the charge/discharge integrated value for the registered charge/discharge device exceeds a predetermined first threshold; and determine, when it is determined that the second charge/discharge device 50 is the unregistered charge/discharge device, whether or not the charge/discharge integrated value for the unregistered charge/discharge device exceeds a predetermined second threshold smaller than the first threshold.

More specifically, the charge/discharge threshold determination unit 150 is configured to: determine whether or not the charge/discharge integrated value indicated by the registered charge/discharge history data 193 stored in the storage unit 190 exceeds the first threshold; and determine whether or not the charge/discharge integrated value indicated by the unregistered charge/discharge history data 194 stored in the storage unit 190 exceeds the second threshold.

Here, the registered charge/discharge device is a charge/discharge device which is preliminarily registered, such as a power socket at home, for example. Furthermore, the unregistered charge/discharge device is a charge/discharge device which is not a registered charge/discharge device, such as a power socket at a friend's house, for example. In other words, the first threshold for the registered charge/discharge device is set to be greater than the second threshold for the unregistered charge/discharge device, whereby the convenience of the user can be improved. It is to be noted that the first threshold and the second threshold is not limited to a specific value, and any value may be set by the user.

The penalty execution unit 160 is configured to execute, when it is determined that the charge/discharge integrated value exceeds the threshold, a penalty operation including limiting charging or discharging to or from the secondary battery 200 or issuing an alert. For example, the penalty execution unit 160 is configured to execute, when it is determined that the charge/discharge integrated value exceeds the threshold, the penalty operation at next charge or discharge to or from the secondary battery 200 performed by the second charge/discharge device 50.

Specifically, the penalty execution unit 160 is configured to execute the penalty operation (i) when it is determined that the charge/discharge integrated value which is the integrated value for the registered charge/discharge device exceeds the first threshold or (ii) when it is determined that the charge/discharge integrated value which is the integrated value for the unregistered charge/discharge device exceeds the second threshold.

The alert execution unit 170 is configured to issue an alert when a difference between the charge/discharge integrated value and the threshold is smaller than or equal to a predetermined value. In other words, the alert execution unit 170 issues an alert when the charge/discharge integrated value is closer to the predetermined value. It is to be noted that the threshold is not limited to a specific value, and any value may be set by the user.

The registered charge/discharge determination unit 180 is configured to determine, when it is determined that the charge/discharge device is the second charge/discharge device 50, whether the second charge/discharge device 50 is the registered charge/discharge device or the unregistered charge/discharge device which is not the registered charge/discharge device, with reference to the registered charge/discharge device data 192 stored in the storage unit 190.

Then, the registered charge/discharge determination unit 180 is configured to: accumulate, when the registered charge/discharge determination unit 180 determines that the second charge/discharge device 50 is the registered charge/discharge device, history of charge or discharge to or from the secondary battery 200 performed by the registered charge/discharge device, in the registered charge/discharge history data stored in the storage unit 190; and accumulate, when the registered charge/discharge determination unit 180 determines that the second charge/discharge device 50 is the unregistered charge/discharge device, history of charge or discharge to or from the secondary battery 200 performed by the unregistered charge/discharge device, in the unregistered charge/discharge history data 194 stored in the storage unit 190.

The storage unit 190 is a memory storing information for managing the history information of the secondary battery 200. The following provides a detailed description on the battery history data 191, the registered charge/discharge device data 192, the registered charge/discharge history data 193, the unregistered charge/discharge history data 194, the threshold data 195, the key information data 196, and the battery ID data 197, which are stored in the storage unit 190.

FIG. 3 shows an example of the battery history data 191 according to the embodiment of the present invention.

The battery history data 191 is a group of data for recording the history information of the secondary battery 200. As shown in FIG. 3, the battery history data 191 includes data such as: time of day; the number of times of charge/discharge, an amount of charge/discharge, SOC, and SOH.

The time of day indicates the time of day when the event has happened. The number of times of charge/discharge indicates the integrated value of the number of charge or the number of discharge at the time of day. The amount of charge/discharge indicates the amount of charge or amount of discharge performed by the charge/discharge device at the time of day. SOC and SOH indicate SOC and SOH at the time of day.

Specifically, the number of times of charge/discharge is indicated by indicating the number of times of charge with a plus (+) while indicating the number of times of discharge with a minus (−). Thus, the number of times of charge and the number times of discharge can be identified. Furthermore, the amount of charge/discharge is indicated by indicating the amount of charge with a plus (+) while indicating the amount of discharge with a minus (−). Thus, the amount of charge and the amount of discharge can be identified.

Here, the amount of charge/discharge may be replaced by data by which the amount of charge and/or discharge can be calculated, such as a voltage value, a current value, and a resistance value. Furthermore, SOC (state of charge) is an index indicating a state-of-charge of a battery, and is calculated as a rate of remaining capacity to the full charging capacity. Furthermore, SOH (state of health) is an index indicating a state of deterioration of a battery, and is calculated as a rate of a full charging capacity when the battery is deteriorated to a full charging capacity when the battery is started to be used.

Furthermore, the battery history data 191 may include data other than the above. For example, the battery history data 191 may include a parameter unique to batteries, such as full charge holding period and period or the number of times of over discharge, and a parameter related to electric vehicles such as total usage period, the number of years to keep, and travel distance (total amount of power used).

Furthermore, the battery history data 191 may also include accelerator opening, regeneration amount, acceleration rate, speed, angle of inclination, use history of an air conditioner, a heater, and a light, idle running history of a tire, an operational history of ABS, and history of resetting skid protection function, in conjunction with an engine control unit (ECU) of the electric vehicle.

Furthermore, the battery history data 191 may include data obtained by compressing and/or encrypting the above data.

It is to be noted that the data included in the battery history data 191 is written and updated by battery history recording unit 120, and deleted after being transmitted to the server 40 by the history upload control unit 130.

FIG. 4 shows an example of the registered charge/discharge device data 192 according to the embodiment of the present invention.

The registered charge/discharge device data 192 is a group of data indicating the registered charge/discharge device that is the second charge/discharge device 50 previously registered. As shown in FIG. 4, the registered charge/discharge device data 192 includes (i) a registered charge/discharge device (ii) and a registered charge/discharge device ID for identifying the registered charge/discharge device registered as the registered charge/discharge device.

In this manner, the charge/discharge device registered as the registered charge/discharge device is assigned with an ID. For example, a charge/discharge device 1, which is a power socket at home, is registered as the registered charge/discharge device, and assigned with G1 as the registered charge/discharge device ID. Thus, it is possible to identify the registered charge/discharge device.

It is to be noted that the data included in the registered charge/discharge device data 192 is written and updated by the registered charge/discharge determination unit 180. Furthermore, the registered charge/discharge determination unit 180 determines whether the second charge/discharge device 50 is the registered charge/discharge device or the unregistered charge/discharge device, with reference to the registered charge/discharge device data 192.

FIG. 5 shows an example of the registered charge/discharge history data 193 according to the embodiment of the present invention.

The registered charge/discharge history data 193 is a group of data indicating the registered charge/discharge history which is history of charge or discharge to or from the secondary battery 200 performed by the registered charge/discharge device. As shown in FIG. 5, the registered charge/discharge history data 193 includes the number of times of charge/discharge, the time of day of charge/discharge, the amount of charge/discharge, and the registered charge/discharge device ID.

The number of times of charge/discharge indicates the integrated value of the number of times of charge or the number of times of discharge performed on the secondary battery 200 by the registered charge/discharge device. The time of day of charge/discharge indicates the time of day when the charge or discharge is performed by the charge/discharge device. The amount of charge/discharge indicates the amount of charge and/or discharge performed by the registered charge/discharge device. The registered charge/discharge device ID indicates the registered charge/discharge device ID for identifying the registered charge/discharge device which has performed the charge or discharge.

Specifically, the number of times of charge/discharge is indicated by indicating the number of times of charge with a plus (+) while indicating the number of times of discharge with a minus (−). Thus, an integrated value of the number of times of charge, an integrated value of the number of times of discharge, or an integrated value of the number of times of charge and the number of times of discharge, can be calculated as the charge/discharge integrated value.

Furthermore, the amount of charge/discharge is indicated by indicating the amount of charge with a plus (+) while indicating the amount of discharge with a minus (−). Thus, an integrated value of the amount of charge, an integrated value of the amount of discharge, or an integrated value of an absolute value of an amount of charge and an absolute value of an amount of discharge, can be calculated as the charge/discharge integrated value.

It is to be noted that the data included in the registered charge/discharge history data 193 is written and updated by the registered charge/discharge determination unit 180, and deleted after the battery history data 191 is transmitted to the server 40 by the history upload control unit 130. Furthermore, the charge/discharge threshold determination unit 150 determines the charge/discharge integrated value with reference to the registered charge/discharge history data 193.

FIG. 6 shows an example of the registered charge/discharge history data 194 according to the embodiment of the present invention.

The unregistered charge/discharge history data 194 is a group of data indicating the unregistered charge/discharge history which is history of charge and/or discharge to and/or from the secondary battery 200 performed by the unregistered charge/discharge device. As shown in FIG. 6, the unregistered charge/discharge history data 194 includes the number of times of charge/discharge, time of day of charge/discharge, and the amount of charge/discharge.

The number of times of charge/discharge indicates the integrated value of the number of charge or the number of times of discharge performed on the secondary battery 200 by the unregistered charge/discharge device. The time of day of charge/discharge indicates the time of day when the charge or discharge is performed by the charge/discharge device. The amount of charge/discharge indicates the amount of charge/discharge performed by the unregistered charge/discharge device.

Specifically, the number of times of charge/discharge is indicated by indicating the number of times of charge with a plus (+) while indicating the number of times of discharge with a minus (−). Thus, the integrated value of the number of times of charge, the integrated value of the number of times of discharge, or the integrated value of the number of times of charge and the number of times of discharge, can be calculated as the charge/discharge integrated value.

Furthermore, the amount of charge/discharge is indicated by indicating the amount of charge with a plus (+) while indicating the amount of discharge with a minus (−). Thus, an integrated value of the amount of charge, an integrated value of the amount of discharge, or an integrated value of an absolute value of an amount of charge and an absolute value of an amount of discharge, can be calculated as the charge/discharge integrated value.

It is to be noted that the data included in the unregistered charge/discharge history data 194 is written and updated by the registered charge/discharge determination unit 180, and deleted after the battery history data 191 is transmitted to the server 40 by the history upload control unit 130. Furthermore, the charge/discharge threshold determination unit 150 determines the charge/discharge integrated value with reference to the unregistered charge/discharge history data 194.

FIG. 7 shows an example of the threshold data 195 according to the embodiment of the present invention.

The threshold data 195 is a group of data including the threshold for the charge/discharge threshold determination unit 150 to determine the charge/discharge integrated value. As shown in FIG. 7, the threshold data 195 includes the first threshold and the second threshold. Here, the second threshold is a value smaller than the first threshold.

It is to be noted that the data included in the threshold data 195 is written and updated by the charge/discharge threshold determination unit 150. Furthermore, the charge/discharge threshold determination unit 150 determines the charge/discharge integrated value with reference to the threshold data 195. Furthermore, the alert execution unit 170 issues an alert with reference to the threshold data 195.

Furthermore, the key information data 196 which is other data stored in the storage unit 190 holds a public key and a secret key used when the certificate verification unit 140 verifies the certificate. The battery ID data 197 holds a battery ID for identifying the secondary battery 200.

A detailed description is provided on the processing to manage the history information of the secondary battery 200, performed by the battery history information management device 100.

Figure 8:
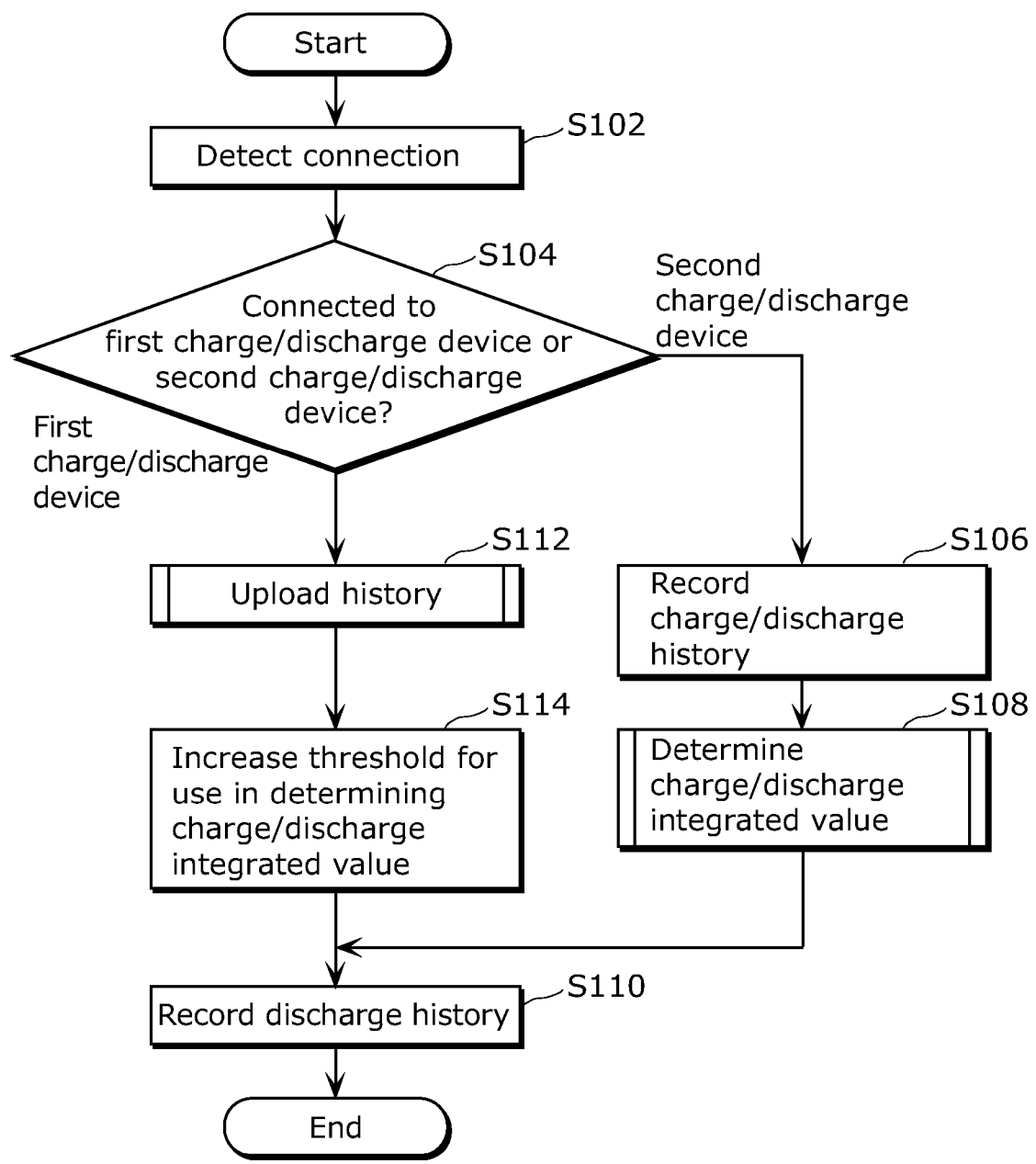
FIG. 8 shows a flowchart showing an example of an operation performed by the battery history information management device according to the embodiment of the present invention.

FIG. 8 shows a flowchart showing an example of an operation performed by the battery history information management device 100 according to the embodiment of the present invention.

As shown in FIG. 8, the connection determination unit 110 first detects that a charge/discharge device is connected for charging or discharging the secondary battery 200 (S102).

Then, the connection determination unit 110 determines whether the charge/discharge device connected is the first charge/discharge device 20 or the second charge/discharge device 50, the first charge/discharge device 20 being connected to the server 40, and the second charge/discharge device 50 not being connected to the server 40 (S104).

When the connection determination unit 110 determines that the charge/discharge device is the second charge/discharge device 50 ("second charge/discharge device" in S104), the battery history recording unit 120 records the charge/discharge history into the battery history data 191, the charge/discharge history being history of charge or discharge to or from the secondary battery 200 performed by the second charge/discharge device 50 (S106). In other words, the battery history recording unit 120 updates the battery history data 191 by storing the charge/discharge history into the storage unit 190. It is to be noted that the secondary battery 200 is charged or discharged by the second charge/discharge device 50.

Then, the charge/discharge threshold determination unit 150 determines whether or not the charge/discharge integrated value of the secondary battery 200 exceeds the predetermined threshold (S108). Description is provided later on details of the processing of determining the charge/discharge integrated value performed by the charge/discharge threshold determination unit 150.

When the secondary battery 200 is used and the power is discharged, the battery history recording unit 120 records the discharge history of the secondary battery 200 into the battery history data 191 (S110). For example, the battery history recording unit 120 updates the battery history data

191 by storing into the storage unit 190 the SOC and SOH after the discharge of the secondary battery 200, as the discharge history.

Furthermore, when the connection determination unit 110 determines that the charge/discharge device is the first charge/discharge device 20 ("first charge/discharge device" in S104), the history upload control unit 130 transmits the battery history data 191 to the server 40 via the first charge/discharge device 20 (S112). At this time, the secondary battery 200 is charged or discharged by the first charge/discharge device 20, and the history upload control unit 130 deletes, from the battery history data 191, the history information which the history upload control unit 130 has transmitted to the server 40. Description is provided later on details of the processing of uploading the battery history data 191 to the server 40 performed by the history upload control unit 130.

Then, the charge/discharge threshold determination unit 150 increases the threshold for determining the charge/discharge integrated value (S114). It is to be noted that the charge/discharge threshold determination unit 150 does not necessarily increase the threshold for each time the history upload control unit 130 transmits the battery history data 191 to the server 40 (S112), but may increase the threshold when the history upload control unit 130 transmits the battery history data 191 to the server 40 for a predetermined number of times.

Then, when the secondary battery 200 is used and the power is discharged, the battery history recording unit 120 records the discharge history of the secondary battery 200 into the battery history data 191 (S110).

By repeating the above processing, the battery history information management device 110 causes the server 40 to manage the history information of the secondary battery 200.

The following describes the details of the processing of determining the charge/discharge integrated value performed by the charge/discharge threshold determination unit 150 (S108 in FIG. 8).

Figure 9:
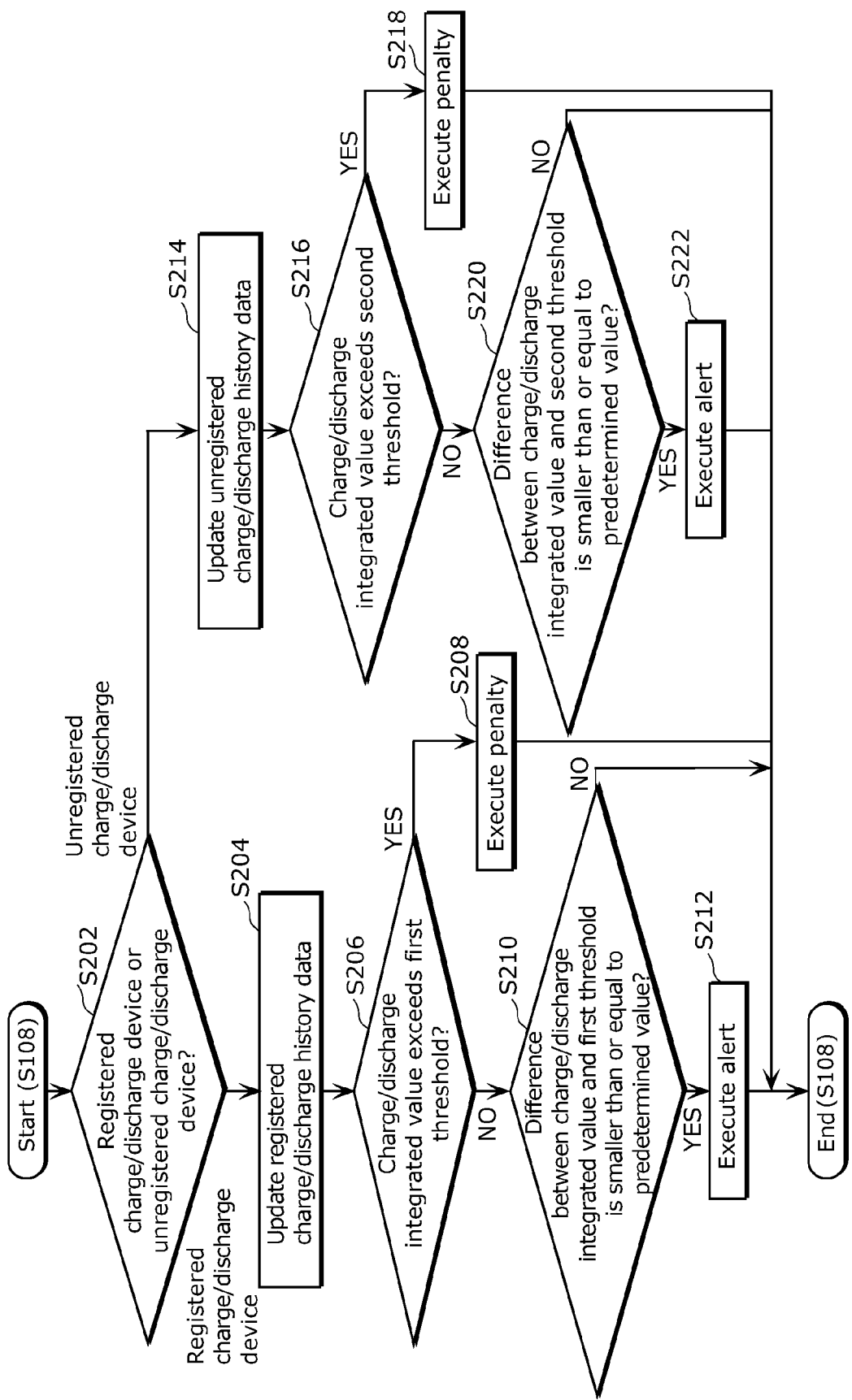
FIG. 9 shows a flowchart showing details of a processing of determining a charge/discharge integrated value, performed by a charge/discharge threshold determination unit according to the embodiment of the present invention.

FIG. 9 shows a flowchart showing details of the processing of determining the charge/discharge integrated value, performed by the charge/discharge threshold determination unit 150 according to the embodiment of the present invention.

As shown in FIG. 9, the registered charge/discharge determination unit 180 first determines whether the second charge/discharge device 50 which performs the charge or discharge is the registered charge/discharge device or the unregistered charge/discharge device, with reference to the registered charge/discharge device data 192 (S202). Specifically, the registered charge/discharge determination unit 180 determines whether or not the second charge/discharge device 50 is the charge/discharge device included in the registered charge/discharge device in the registered charge/discharge device data 192.

Here, the registered charge/discharge determination unit 180 updates the registered charge/discharge device data 192 by preliminarily assigning the registered charge/discharge device ID to the charge/discharge device. Description is provided later on details of the processing of updating the registered charge/discharge device data 192 performed by the registered charge/discharge determination unit 180.

Then, when the registered charge/discharge determination unit 180 determines that the second charge/discharge device 50 is the registered charge/discharge device, ("registered charge/discharge device" in S202), the registered charge/discharge determination unit 180 updates the registered charge/discharge history data 193 by accumulating history of charge or discharge to or from the secondary battery 200 performed by the registered charge/discharge device (S204).

Then, the charge/discharge threshold determination unit 150 determines whether or not the charge/discharge integrated value which is the integrated value of the charge or discharge performed by the registered charge/discharge device exceeds the first threshold (S206). Specifically, the charge/discharge threshold determination unit 150: obtains the charge/discharge integrated value which is the integrated value of the charge or discharge performed by the registered charge/discharge device, with reference to the number of times of charge/discharge or the amount of charge/discharge in the registered charge/discharge history data 193; and determines whether or not the obtained charge/discharge integrated value exceeds the first threshold, with reference to the first threshold in the threshold data 195.

Then, when the charge/discharge threshold determination unit 150 determines that the charge/discharge integrated value exceeds the first threshold (YES in S206), the penalty execution unit 160 executes a penalty operation including limiting charging or discharging to or from the secondary battery or issuing an alert (S208).

As to the penalty operation, specifically, the penalty execution unit 160: prohibits the charge or discharge to or from the secondary battery 200 to be performed by the second charge/discharge device 50; limits the amount of charge to the second charge/discharge device 50; limits the discharge output discharged from the second charge/discharge device 50; or keeps issuing the alert, for example. Furthermore, in the case where the second charge/discharge device 50 is mounted on an electric vehicle, the penalty execution unit 160 limits the travelling speed of the electric vehicle to low speed, or stops the air conditioner or the audio of the electric vehicle.

Furthermore, as to the timing to execute the penalty operation, the penalty execution unit 160 executes the penalty operation: immediately when it is determined that the charge/discharge integrated value exceeds the first threshold; or when it is determined that the charge/discharge integrated value exceeds the first threshold and the next charge or discharge to or from the secondary battery 200 performed by the second charge/discharge device 50, for example. It is to be noted that in the case where the second charge/discharge device 50 is mounted on an electric vehicle, the penalty execution unit 160 may be set not to execute the penalty operation while the electric vehicle is running, since it is dangerous to execute the penalty operation while the electric vehicle is running.

Furthermore, when the charge/discharge threshold determination unit 150 determines that that the charge/discharge integrated value does not exceed the first threshold (NO in S206), the alert execution unit 170 determines whether or not a difference between the charge/discharge integrated value and the threshold is smaller than or equal to a predetermined value (S210).

Then, when the alert execution unit 170 determines that the difference between the charge/discharge integrated value and the first threshold is smaller than or equal to the predetermined value (YES in S210), the alert execution unit 170 issues an alert (S212). Furthermore, when the alert execution unit 170 determines that the difference between the charge/discharge integrated value and the first threshold is greater than the predetermined value (NO in S210), the alert execution unit 170 completes the processing.

Furthermore, when the registered charge/discharge determination unit 180 determines that the second charge/discharge device 50 which performs the charge or discharge is the unregistered charge/discharge device, ("unregistered charge/discharge device" in S202), the registered charge/discharge determination unit 180 updates the unregistered charge/discharge history data 194 by accumulating history of charge or discharge to or from the secondary battery 200 performed by the unregistered charge/discharge device (S214).

Then, the charge/discharge threshold determination unit 150 determines whether or not the charge/discharge integrated value which is the integrated value of the charge or discharge performed by the unregistered charge/discharge device exceeds the second threshold (S216). Specifically, the charge/discharge threshold determination unit 150: obtains the charge/discharge integrated value which is the integrated value of the charge or discharge performed by the registered charge/discharge device, with reference to the number of times of charge/discharge or the amount of charge/discharge in the unregistered charge/discharge history data 194; and determines whether or not the obtained charge/discharge integrated value exceeds the second threshold, with reference to the second threshold in the threshold data 195.

Then, when the charge/discharge threshold determination unit 150 determines that the charge/discharge integrated value exceeds the second threshold (YES in S216), the penalty execution unit 160 executes a penalty operation including limiting charging or discharging to or from the secondary battery or issuing an alert (S218). The details on the processing of executing the penalty operation performed by the penalty execution unit 160 here is omitted, since it is the same as the processing performed by the penalty execution unit 160 (S208) above.

Furthermore, when the charge/discharge threshold determination unit 150 determines that the charge/discharge integrated value does not exceed the second threshold (NO in S216), the alert execution unit 170 determines whether or not a difference between the charge/discharge integrated value and the second threshold is smaller than or equal to a predetermined value (S220).

Then, when the alert execution unit 170 determines that the difference between the charge/discharge integrated value and the second threshold is smaller than or equal to the predetermined value (YES in S220), the alert execution unit 170 issues an alert (S222). Furthermore, when the alert execution unit 170 determines that the difference between the charge/discharge integrated value and the second threshold is greater than the predetermined value (NO in S220), the alert execution unit 170 completes the processing.

With the above, the processing of determining the charge/discharge integrated value performed by the charge/discharge threshold determination unit 150 (S108 in FIG. 8) is completed.

The following describes the details of the processing of preliminarily updating the registered charge/discharge device data 192 prior to the determination on the second charge/discharge device 50 performed by the registered charge/discharge determination unit 180 (S202 in FIG. 9).

Figure 10:
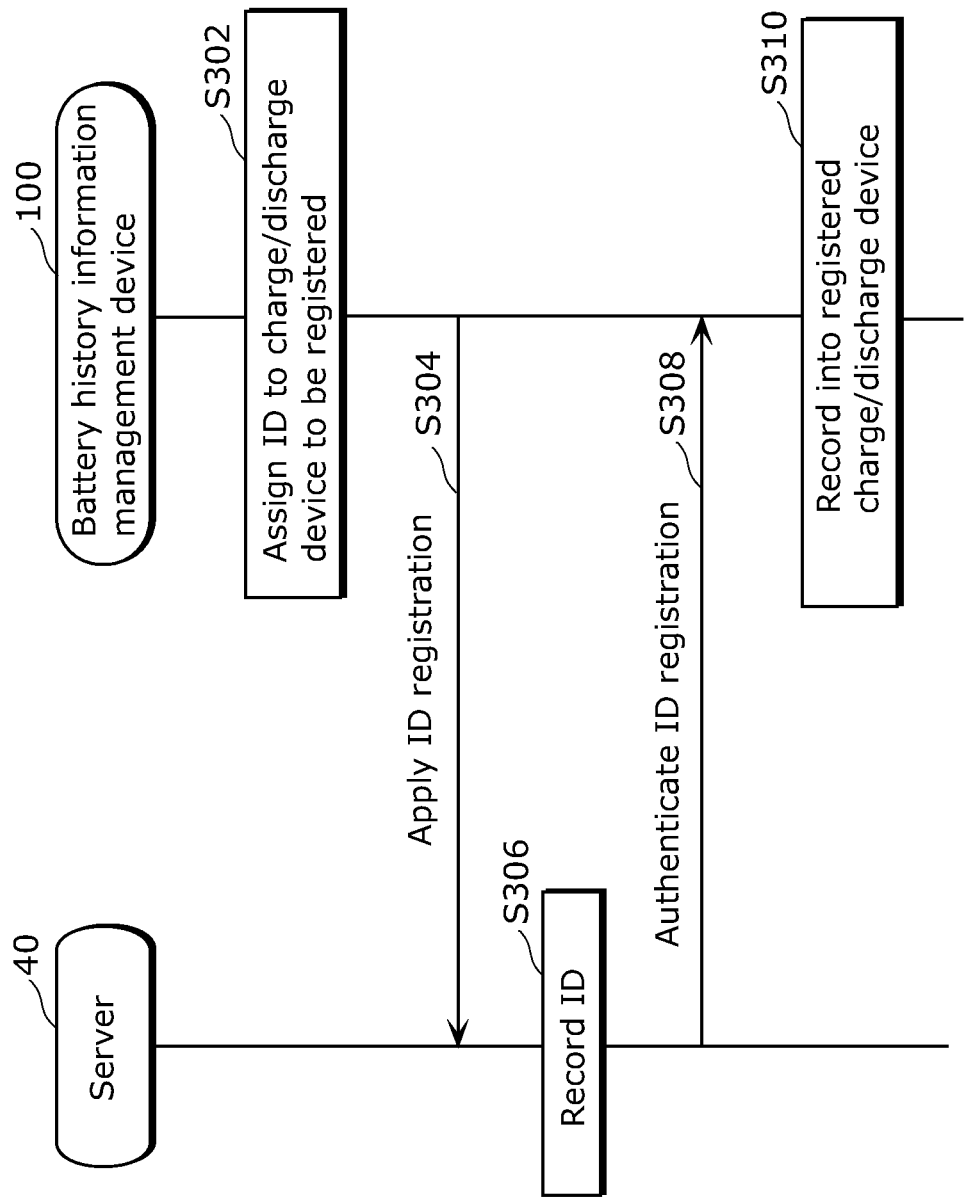
FIG. 10 shows a flowchart showing details of processing of updating the registered charge/discharge device data performed by a registered charge/discharge determination unit according to the embodiment of the present invention.

FIG. 10 shows a flowchart showing the details of the processing of updating the registered charge/discharge device data 192, performed by the registered charge/discharge determination unit 180 according to the embodiment of the present invention.

As shown in FIG. 10, the registered charge/discharge determination unit 180 of the battery history information management device 100 first assigns a registered charge/discharge device ID to a charge/discharge device to be registered (S302). Specifically, when the battery history information management device 100 is connected to the second charge/discharge device 50 and if the second charge/discharge device 50 is the charge/discharge device to be registered, the registered charge/discharge determination unit 180 assigns a registered charge/discharge device ID to the second charge/discharge device 50. It is to be noted that the registered charge/discharge determination unit 180 may be set to assign the registered charge/discharge device to the charge/discharge device to be registered according to an input by the user.

Then, the registered charge/discharge determination unit 180 performs a registration application of the ID to the server 40 (S304). Here, it is assumed that the battery history information management device 100 is connected to the first charge/discharge device 20, and the registered charge/discharge determination unit 180 instructs the first charge/discharge device 20 to perform a registration application of the ID, so that a registration application of the ID is performed to the server 40.

It is to be noted that when the registered charge/discharge determination unit 180 and the first charge/discharge device 20 are not directly connected as shown in FIG. 2, the registered charge/discharge determination unit 180 instructs the first charge/discharge device 20 to perform the registration application of the ID via another processing unit connected to the first charge/discharge device 20, such as the connection determination unit 110, so that the registration application of the ID is performed to the server 40.

Next, the server 40 receives the registration application from the registered charge/discharge determination unit 180 via the first charge/discharge device 20, and records the applied ID into an internal memory (S306). Then, the server 40 issues a registration authorization for the ID (S308).

Then, the registered charge/discharge determination unit 180 receives the registration authorization for the ID from the server 40, and records the ID into the registered charge/discharge device data 192 (S310). In other words, the registered charge/discharge determination unit 180 updates the registered charge/discharge device data 192 by recording the ID, as the registered charge/discharge device ID, into the registered charge/discharge device data 192 in association with the charge/discharge device to be registered.

With the above, the processing of updating the registered charge/discharge device data 192 performed by the registered charge/discharge determination unit 180 is completed.

The following describes the details of the processing of uploading the battery history data 191 to the server 40 performed by the history upload control unit 130 (S112 in FIG. 8). Here, it is assumed that the battery history information management device 100 holds a public key certificate having a secret key SK_i, a public key PK_i, and a battery ID IDb_i. The server 40 also holds a public key certificate having a secret key SKs, a public key PKs, and the battery ID IDb_i.

Figure 11:
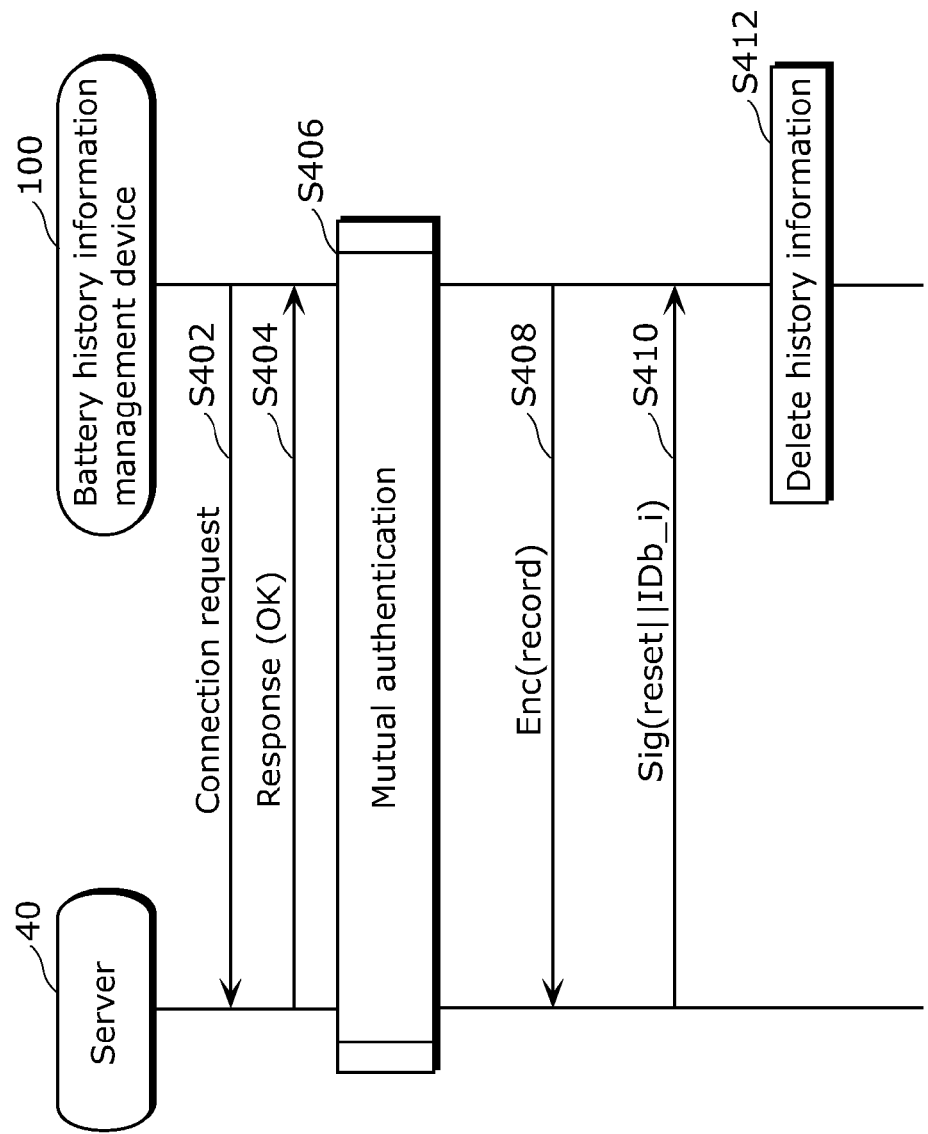
FIG. 11 shows a flowchart showing details of a processing of uploading the battery history data to the server, performed by a history upload control unit according to the embodiment of the present invention.

FIG. 11 shows a flowchart showing details of a processing of uploading the battery history data 191 to the server 40, performed by the history upload control unit 130 according to the embodiment of the present invention.

As shown in FIG. 11, the certificate verification unit 140 of the battery history information management device 100 transmits a connection request to the serer 40 via the first charge/discharge device 20 (S402). Upon receiving the connection request, the server 40 returns a response notifying that the connection has been established to the certificate verification unit 140 via the first charge/discharge device 20 (S404).

Then, the certificate verification unit 140 and the server 40 perform a mutual authentication (S406). Description is provided later on details of the processing of mutual authentication performed by the certificate verification unit 140 and the server 40.

Next, the certificate verification unit 140 encrypts the battery history data 191, which is to be transmitted to the server 40, using the public key of the server 40, and transmits the encrypted battery history data 191 to the server 40, as Enc(record) (S408). Then, the server 40 receives the encrypted data and decodes the encrypted data received, to obtain the battery history data 191.

Then, the server 40: binds the battery ID (IDb_i) of the secondary battery 200 to reset information, which is for deleting the history information recorded in the battery history data 191; generates a signature Sig(reset||IDb_i); and transmits the signature to the certificate verification unit 140 (S410). Then, the certificate verification unit 140 receives the signature, and verifies the signature with reference to the battery ID in the battery ID data 197.

Then, when the certificate verification unit 140 verifies that the signature is correct, the certificate verification unit 140 causes the history upload control unit 130 to delete the history information using the reset information (S412). Then, the history upload control unit 130 deletes from the battery history data 191 the history information stored in the battery history data 191 the history upload control unit 130 has transmitted to the server 40.

At this time, the history upload control unit 130 also deletes the registered charge/discharge history included in the registered charge/discharge history data 193 and the unregistered charge/discharge history included in the unregistered charge/discharge history data 194.

With the above, the processing of uploading the battery history data 191 to the server 40 performed by the history upload control unit 130 (S112 in FIG. 8) is completed.

The following describes the details on the mutual authentication processing (S406 in FIG. 11) performed by (i) the certificate verification unit 140 of the battery history information management device 100 and (ii) the server 40.

Figures 12, 13:
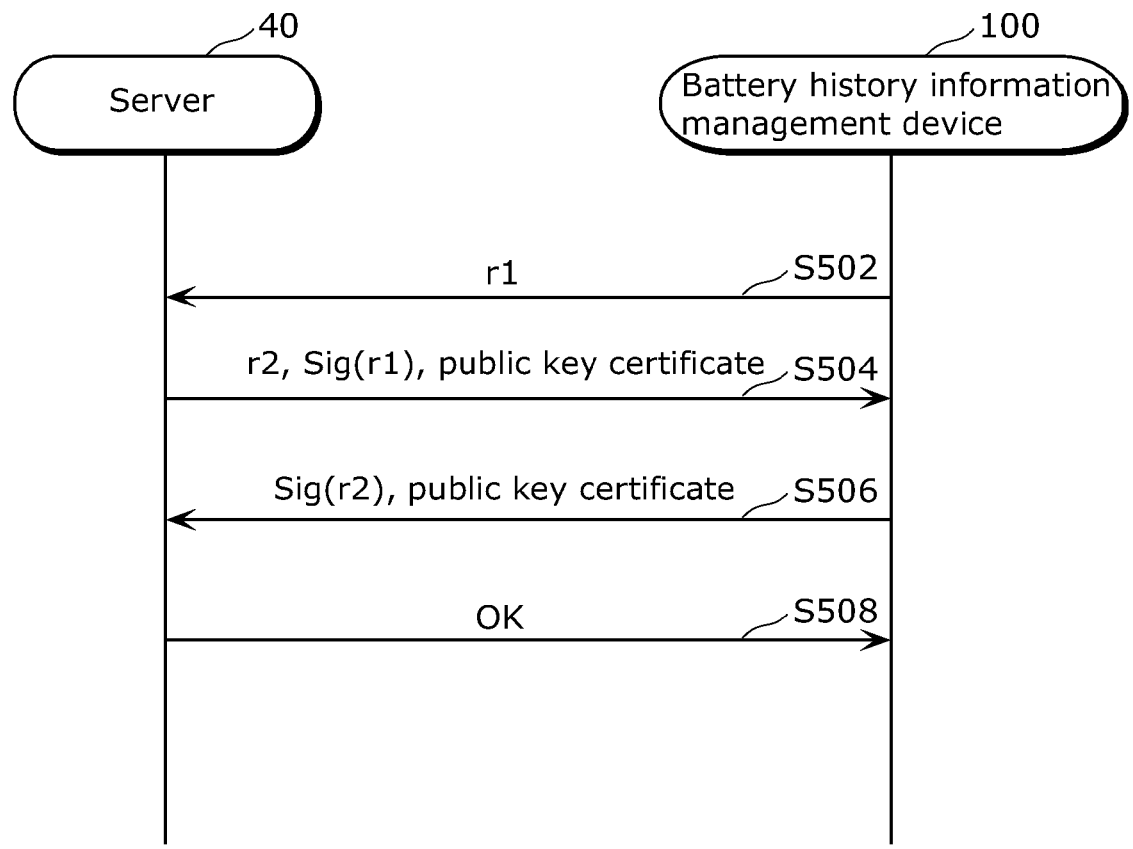
FIG. 12 shows a flowchart showing details on mutual authentication processing performed by the battery history information management device and the server according to the embodiment of the present invention.
FIG. 13 shows an example of registered charge/discharge device data according to Modification example 1 of the embodiment of the present invention.

FIG. 12 shows a flowchart showing the details on the mutual authentication processing performed by the battery history information management device 100 and the server 40 according to the embodiment of the present invention.

As shown in FIG. 12, the certificate verification unit 140 of the battery history information management device 100 first generates a random number r1, and transmits the random number r1 to the serer 40 via the first charge/discharge device 20 (S502). Then, the server 40 receives the random number r1, generates a signature Sig(r1) for the random number r1 with the secret key SKs of the server 40, and generates a random number r2.

Next, the server 40 transmits the random number r2, the signature Sig(r1), and the public key certificate, to the certificate verification unit 140 via the first charge/discharge device 20 (S504). Then, the certificate verification unit 140 receives the random number r2, the signature Sig(r1), and the public key certificate, and performs a signature verification using the public key of the public key certificate.

When the certificate verification unit 140 verifies that the signature is correct, the certificate verification unit 140 generates a signature Sig(r2) for the random number r2 with the secret key SK_i, and transmits to the server 40 the signature Sig(r2) and the public key certificate (S506). When the certificate verification unit 140 verifies that the signature is not correct, the certificate verification unit 140 returns an NG to the server 40, and disconnects from the server 40.

Then, the server 40 receives the signature Sig(r2) and the public key certificate, and performs a signature verification using the public key of the public key certificate.

Then, when the server 40 determines that the signature is correct, the server 40 returns an OK to the certificate verification unit 140 (S508). Furthermore, when the server 40 determines that the signature is not correct, the server 40 returns an NG to the certificate verification unit 140, and disconnects from the battery history information management device 100.

With the above, the processing of mutual authentication performed by (i) the certificate verification unit 140 of the battery history information management device 100 and (ii) the server 40 (S406 in FIG. 11) is completed.

As described above, the battery history information management device 100 according to the embodiment of the present invention: records, when the battery history information management device 100 determines that the charge/discharge device connected to the secondary battery 200 is not connected via the communication network 30 to the server 40 which manages the history information, the charge/discharge history into the battery history data 191; and transmits, when the battery history information management device 100 determines that the charge/discharge device is connected to the server 40, the battery history data 191 to the server 40 via the charge/discharge device. In other words, the battery history information management device 100 accumulates the charge/discharge history into a memory, when the charge or discharge is performed by the charge/discharge device not connected to the server 40. When the charge or discharge is performed using the charge/discharge device connected to the server 40, the battery history information management device 100 transmits the accumulated charge/discharge history to the server 40. Thus, the charge/discharge history of the battery history information management device 100 is managed at the server 40, whereby the charge/discharge history cannot be rewritten with ease. Therefore, the unauthorized rewriting of the history information of the secondary battery 200 can be suppressed.

Furthermore, the battery history information management device 100 deletes, from the battery history data 191 stored in the storage unit, the history information which the battery history information management device 100 has transmitted to the server 40. In other words, the battery history information management device 100 resets the history information which the battery history information management device 100 has transmitted to the server 40, when uploading the battery history data 191 to the server 40. Thus, an increase in the used capacity of the storage unit can be suppressed. Furthermore, since the history information is deleted from a memory of the battery history information management device 100, the history information cannot be rewritten even when the information in the memory is rewritten. Therefore, the unauthorized rewriting of the history information of the secondary battery 200 can be suppressed, and furthermore, the increase of the used capacity of the memory can be suppressed.

Furthermore, when the battery history information management device 100 determines that the charge/discharge integrated value in the charging or discharging using the charge/discharge device not connected to the server 40 exceeds a predetermined threshold, the battery history information management device 100 limits the charging or discharging of the secondary battery 200 or issues an alert. The charge/discharge integrated value is one of the following: the number of times of charge; the number of times of discharge; the number of times of charge-and-discharge; an amount of charge; an amount of discharge; and an amount of charge-and-discharge, for the secondary battery 200. In other words, the battery history information management device 100 encourages a user to charge or discharge using the charge/discharge device connected to the server 40, by imposing a penalty on the user, to suppress the charging or discharging using the charge/discharge device not connected to the server 40. Thus, the user charges or discharges using the charge/discharge device connected to the server 40, whereby the battery history information management device 100 can transmit the accumulated charge/discharge history to the server 40. Therefore, the unauthorized rewriting of the history information of the secondary battery 200 can be suppressed.

Furthermore, the battery history information management device 100 executes, when the battery history information management device 100 determines that the charge/discharge integrated value of the secondary battery 200 exceeds the threshold, the penalty operation at next charging or discharging to or from the secondary battery 200. In other words, at the next charging or discharging, the battery history information management device 100 encourages the user to charge or discharge using the charge/discharge device connected to the server 40. Thus, the user charges or discharges using the charge/discharge device connected to the server 40, whereby the battery history information management device 100 can suppress the unauthorized rewriting of the history information of the secondary battery 200.

Furthermore, the battery history information management device 100 issues an alert when a difference between the charge/discharge integrated value and the threshold is smaller than or equal to the predetermined value. In other words, when the charge/discharge integrated value is closer to the threshold, the battery history information management device 100 encourages the user to charge or discharge using the charge/discharge device connected to the server 40. Thus, the user charges or discharges using the charge/discharge device connected to the server 40, whereby the battery history information management device 100 can suppress the unauthorized rewriting of the history information of the secondary battery 200.

Furthermore, the battery history information management device 100 increases the threshold for determining the charge/discharge integrated value, when the battery history information management device 100 has transmitted the battery history data 191 to the server 40. In other words, the battery history information management device 100 provides the user with an incentive to upload the battery history data 191 to the server 40. Thus, the user charges or discharges using the charge/discharge device connected to the server 40 and upload the battery history data 191 to the server 40, whereby the battery history information management device 100 can suppress the unauthorized rewriting of the history information of the secondary battery 200.

Furthermore, the battery history information management device 100 sets the first threshold to be greater than the second threshold, and executes the penalty operation. The first threshold is for determining the charge/discharge integrated value which is an integrated value of the charge or discharge performed by the registered charge/discharge device, and the second threshold is for determining the charge/discharge integrated value which is an integrated value of the charge or discharge performed by the unregistered charge/discharge device. Here, the registered charge/discharge device is a charge/discharge device which is preliminarily registered, such as a power socket at home, for example. In other words, the battery history information management device 100 improves the convenience of the user by allowing a greater charge/discharge integrated value for charging or discharging using the registered charge/discharge device at home or the like than charging or discharging using the unregistered charge/discharge device. Therefore, the unauthorized rewriting of the history information of the secondary battery can be suppressed, and furthermore, the convenience of the user is improved.

Furthermore, the battery history information management device 100: determines whether or not the charge/discharge integrated value indicated by the registered charge/discharge history data 193 exceeds the first threshold; and determines whether or not the charge/discharge integrated value indicated by the unregistered charge/discharge history data 194 exceeds the second threshold. In other words, the battery history information management device 100 encourages the user to charge or discharge using the charge/discharge device connected to the server 40, by imposing a penalty on the user, to suppress the charging or discharging using the registered charge/discharge device which is not connected to the server 40 or the unregistered charge/discharge device. Thus, the user charges or discharges using the charge/discharge device connected to the server 40, whereby the battery history information management device 100 can transmit the accumulated charge/discharge history to the server 40. Therefore, the unauthorized rewriting of the history information of the secondary battery 200 can be suppressed.

Furthermore, by performing the mutual authentication processing between the certificate verification unit 140 and the server 40, the battery history information management device 100 cannot be connected to an unauthorized server. Furthermore, the server 40 cannot receive information from an unauthorized secondary battery, whereby spoofing can be prevented.

Furthermore, the battery history information management device 100 periodically uploads the battery history data 191 to the server 40, so that the aged deterioration of the secondary battery 200 can be recognized. Particularly, when the second charge/discharge device 50 such as the power socket at home is not connected to the communication network, the battery history information management device 100 may periodically upload the battery history data 191 to the server 40 from the first charge/discharge device 20 placed at public facilities or the like.

Modification Example 1

The following describes Modification example 1 of the above embodiment. In the above embodiment, the registered charge/discharge determination unit 180 uses the registered charge/discharge device ID in determining whether the charge/discharge device which performs the charge or discharge is a registered charge/discharge device or an unregistered charge/discharge device. In Modification example 1, however, the registered charge/discharge determination unit 180 uses position information of the registered charge/discharge device in determining whether the charge/discharge device is the registered charge/discharge device or the unregistered charge/discharge device.

Specifically, the storage unit 190 stores registered charge/discharge device data 192a including the position information of the registered charge/discharge device.

FIG. 13 shows an example of the registered charge/discharge device data 192a according to Modification example 1 of the embodiment of the present invention.

As shown in FIG. 13, the registered charge/discharge device data 192a includes the registered charge/discharge device and the position information of the registered charge/discharge device. For example, the position information of home is registered as the position information of the registered charge/discharge device.

Then, the registered charge/discharge determination unit 180 determines whether the second charge/discharge device 50 is the registered charge/discharge device or the unregistered charge/discharge device, using the position information included in the registered charge/discharge device data 192a and the position information of the secondary battery 200 connected to the second charge/discharge device 50. It is to be noted that the data included in the registered charge/discharge device data 192a is written and updated by the registered charge/discharge determination unit 180.

In this manner, with the battery history information management device 100 according to Modification example 1 of the embodiment of the present invention, determination is made on whether the charge/discharge device performing charge or discharge on the secondary battery 200 is the registered charge/discharge device or the unregistered charge/discharge device, using the position information of the registered charge/discharge device and the position information of the secondary battery 200 connected to the charge/discharge device. Thus, the determination can be easily made on whether or not the charge/discharge device performing charge or discharge on the secondary battery is the registered charge/discharge device, using the position information obtained by a global positioning system (GPS).

Modification Example 2

The following describes Modification example 2 of the above embodiment. In the above embodiment, the history upload control unit 130 transmits to the server 40 the battery history data 191 including the number of times of charge/discharge and the amount of charge/discharge. However, in Modification example 2, the history upload control unit 130 transmits the battery history data further including the battery ID and the place of charge/discharge of the secondary battery 200, to the server 40.

FIG. 14 shows an example of the battery history data 191a according to Modification example 2 of the embodiment of the present invention.

As shown in FIG. 14, the battery history data 191a includes the battery ID and the place of charge/discharge of the secondary battery 200, in addition to the data included in the battery history data 191 in the above embodiment shown in FIG. 3. It is to be noted that the battery history data 191a does not necessarily include all of the data included in the battery history data 191 in the above embodiment, and may not include some the data.

The battery ID is an identifier for identifying the secondary battery 200, and is ID information of a certificate for use in the mutual authentication between the battery history information management device 100 and the server 40, for example.

The place of charge/discharge is information indicating the place at which the secondary battery 200 is charged or discharged. For example, when the charge or discharge is performed on the secondary battery 200 by the second charge/discharge device 50 at home, the place of charge/discharge is indicated by position information obtained by GPS or the like that shows the position of the home. Furthermore, when the charge or discharge is performed to the secondary battery 200 by the first charge/discharge device 20 at public facilities or the like, the place of charge/discharge is indicated by position information obtained by GPS or the like that shows the position of the public facilities.

The data included in the battery history data 191a is written and updated by the battery history recording unit 120, and deleted after being transmitted to the server 40 by the history upload control unit 130.

As described above, with the battery history information management device 100 according to Modification example 2 of the embodiment of the present invention, the history upload control unit 130 transmits to the server 40 the battery history data 191a including the battery ID and the place of charge/discharge of the secondary battery 200. Thus, information for providing various services is accumulated by the server 40 and provided to the user. The services include: when the secondary battery 200 is discharged at public facilities, calculating counter value to be paid to the secondary battery 200; and when the electric vehicle with the secondary battery 200 is stolen, recognizing the position of the electric vehicle, for example.

Although the battery history information management device 100 according to the embodiment and the modification examples of the present invention has been described, the present invention is not limited to the embodiment and the modification example. In other words, the embodiment and modification examples disclosed here should be considered not as limitary but as exemplary in all respects. The scope of the present invention is indicated not by the above description but by the scope of claims, and it is intended that meanings equal to the scope of claims and all changes within the scope of claims are included in the scope of the present invention.

For example, in the present embodiment and the modification examples, the battery history information management system 1 includes the power storage device 10 including the battery history information management device 100 and the secondary battery 200. However, the battery history information management system 1 may not include the secondary battery 200 and may include the battery history information management device 100 instead of the power storage device 10.

Figure 15:
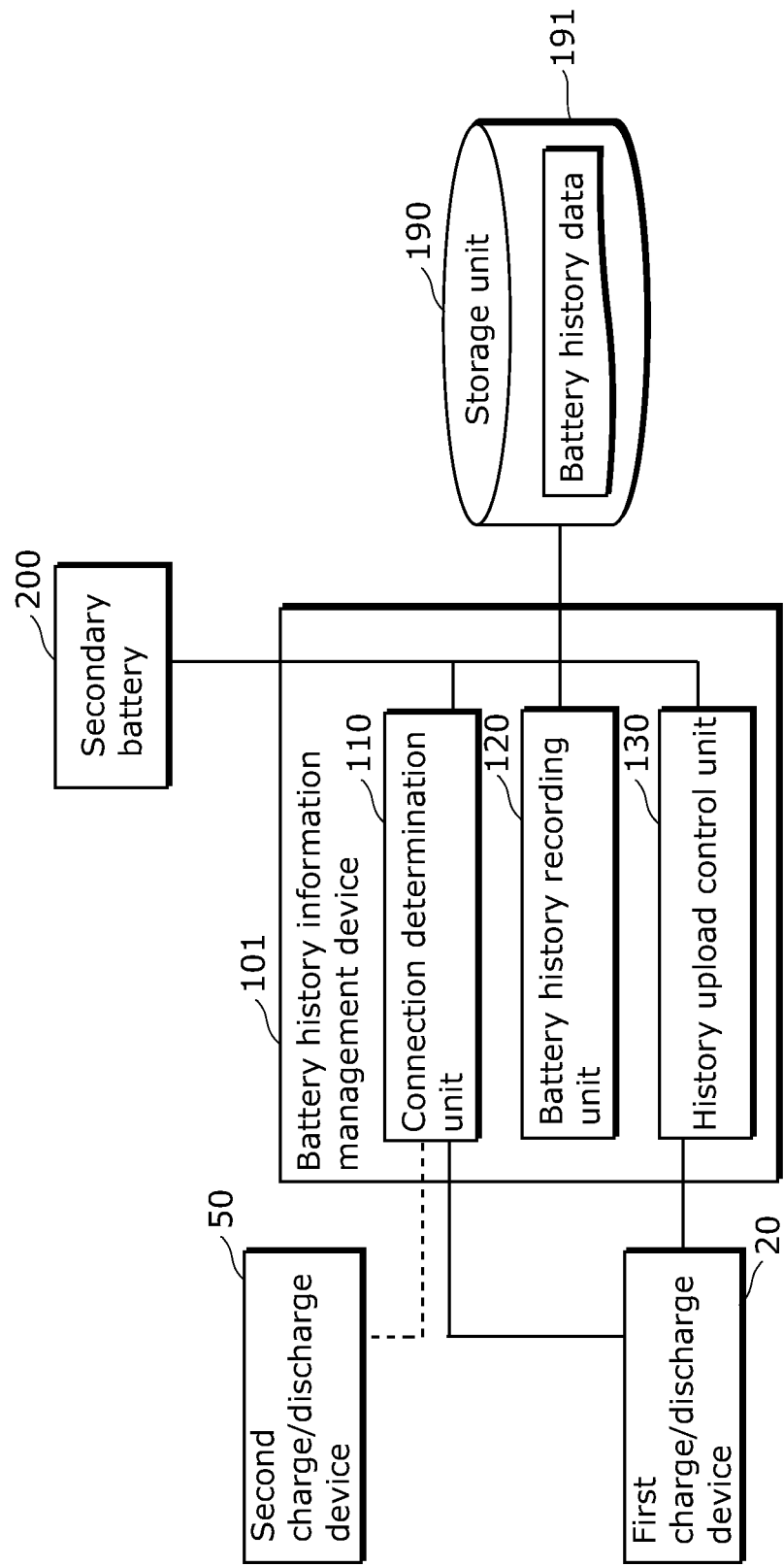
FIG. 15 shows a block diagram showing a minimum configuration of the battery history information management device according to the embodiment of the present invention.
Figure 16:
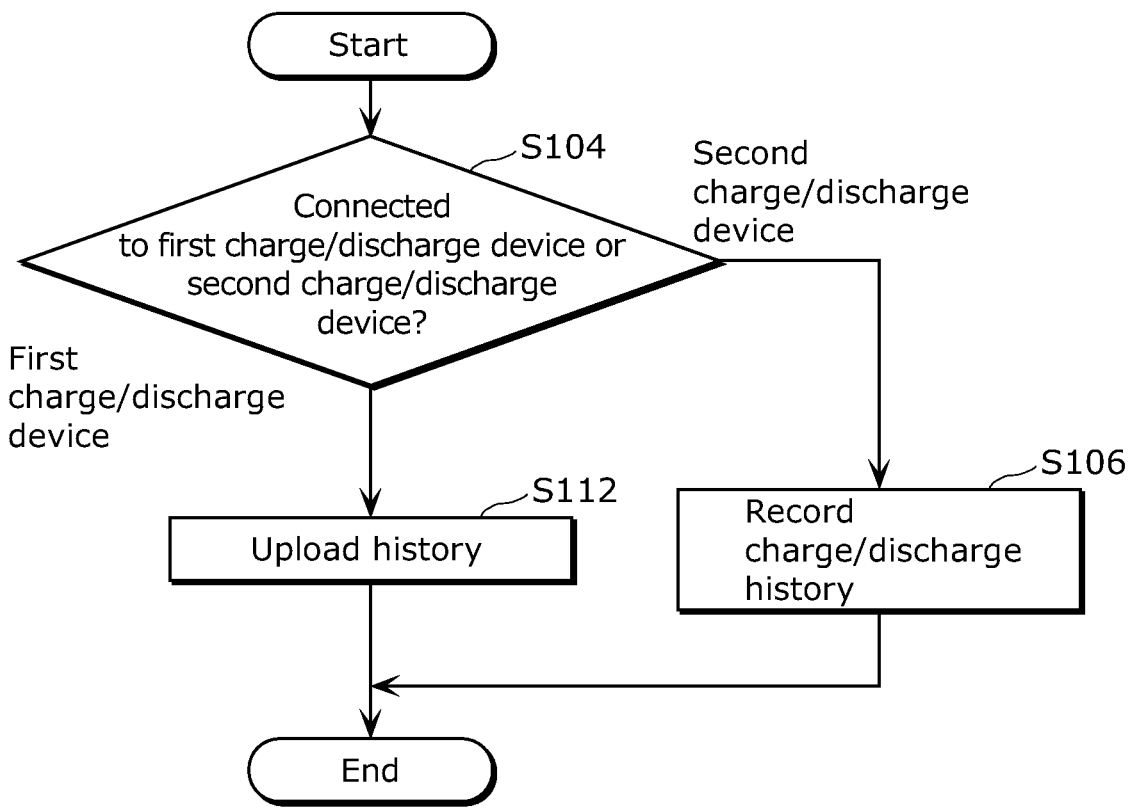
FIG. 16 shows a flowchart showing an operation performed by the battery history information management device with the minimum configuration according to the embodiment of the present invention.

Furthermore, the battery history information management device may not include all of the constitutions shown in FIG. 2. FIG. 15 shows a block diagram showing a minimum configuration of the battery history information management device. FIG. 16 shows a flowchart showing an operation performed by the battery history information management device with the minimum configuration. As shown in FIG. 15, it is sufficient that the battery history information management device 101 includes at least the connection determination unit 110, the battery history recording unit 120, and the history upload control unit 130.

Thus, as shown in FIG. 16, the connection determination unit 110 determines whether a charge/discharge device connected is a first charge/discharge device 20 or a second charge/discharge device 50 (S104), when it is determined that the charge/discharge device is the second charge/discharge device 50, the battery history recording unit 120 records the charge/discharge history into the battery history data 191 (S106), and when it is determined that the charge/discharge device is the first charge/discharge device 20, the history upload control unit 130 transmits the battery history data 191 to the server via 40 the first charge/discharge device 20 (S112). Description on the details is omitted since it is the same as the processing in the above embodiment (S104, S106, and S112 in FIG. 8). With the above, the unauthorized rewriting of the history information of the secondary battery can be suppressed, in the same manner as in the battery history information management device 100 in the above embodiment.

Furthermore, in the present embodiment and the modification examples, the history upload control unit 130 deletes the history information included in the battery history data 191, the registered charge/discharge history included in the registered charge/discharge history data 193, and the unregistered charge/discharge history included in the registered charge/discharge history data 194, after transmitting the history information to the server 40. However, in stead of the deleting, the history upload control unit 130 may mark the battery history data 191, the registered charge/discharge history data 193, and the unregistered charge/discharge history data 194, using a flag, so that (i) the history information to be deleted and (ii) the registered charge/discharge history and the unregistered charge/discharge history can be identified.

Furthermore, in the present embodiment and the modification examples, the charge/discharge threshold determination unit 150 determines the charge/discharge integrated value with reference to the registered charge/discharge history data 193 or the unregistered charge/discharge history data 194 stored in the storage unit 190. However, the registered charge/discharge history data 193 and the unregistered charge/discharge history data 194 may not be stored in the storage unit 190, and the information indicating that the secondary battery 200 has been charged or discharged by the registered charge/discharge device or the unregistered charge/discharge device may be written into the battery history data 191, so that the charge/discharge threshold determination unit 150 determines the charge/discharge integrated value with reference to the battery history data 191.

Furthermore, in the embodiment and the modification example, the charge/discharge threshold determination unit 150 provides the user with an incentive by increasing the threshold for determining the charge/discharge integrated value, when the history upload control unit 130 has transmitted the battery history data 191 to the server 40. However, the incentive to be provided to the user is not limited to increasing the threshold. For example, the battery history information management device may provide the user with an incentive by decreasing the charge fee or increasing the discharge fee.

Furthermore, the present invention can also be achieved as a battery history information management method including, as steps, a characteristic processing unit of the above battery history information management device. Furthermore, the present invention can also be achieved as a program for causing a computer to execute the steps included in the battery history information management method, or a computer-readable recording medium on which the program is recorded. It goes without saying that such a program can be distributed via a recording medium such as a CD-ROM or the like or a transmission medium such as the Internet.

Furthermore, a part or all of the constituent elements constituting each of the processing units of the battery history information management device according to the present invention may be configured as a single Large Scale Integration (LSI). Each of the processing units of the battery history information management device may be integrated into a single separately, or a part or all of them may be integrated into a single chip.

The system LSI introduced here may be referred to as an Integrated circuit (IC), a super LSI, an ultra LSI, depending on integration density.

Furthermore, the technique of integrated circuit is not limited to the LSI, and it may be achieved as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

The LSI may be replaced as a result of advancement in technology for manufacturing semiconductors or appearance of a circuit integration technology derived therefrom. The derived technology may be used to integrate the structural units. Application of biotechnology is one such possibilities.

INDUSTRIAL APPLICABILITY

The present invention can be applied to a battery history information management device which can suppress the unauthorized rewriting of the history information of the secondary battery, and a power storage device including the battery history information management device.

REFERENCE SIGNS LIST

1 Battery history information management system
10 Power storage device
20 First charge/discharge device
30 Communication network
40 Server
50 Second charge/discharge device
100, 101 Battery history information management device
110 Connection determination unit
120 Battery history recording unit
130 History upload control unit
140 Certificate verification unit
500 Charge/discharge threshold determination unit
160 Penalty execution unit
170 Alert execution unit
180 Registered charge/discharge determination unit
190 Storage unit
199, 191a Battery history data
192, 192a Registered charge/discharge device data
193 Registered charge/discharge history data
194 Unregistered charge/discharge history data
195 Threshold data
196 Key information data
197 Battery ID data
200 Secondary battery

The invention claimed is:

1. A battery history information management device for managing history information indicating charge history or discharge history of a secondary battery, the device comprising:
a connection determination unit configured to determine whether a charge/discharge device connected to the secondary battery for charging or discharging the secondary battery is a first charge/discharge device or a second charge/discharge device, the first charge/discharge device being connected via a communication network to a server which manages the history information, and the second charge/discharge device not being connected to the server;

a battery history recording unit configured to record, when it is determined that the charge/discharge device is the second charge/discharge device, charge/discharge history into battery history data for recording the history information, the charge/discharge history being history of charge or discharge to or from the secondary battery performed by the second charge/discharge device;

a history upload control unit configured to transmit, when it is determined that the charge/discharge device is the first charge/discharge device, the battery history data recorded with the history information to the server via the first charge/discharge device; and a certificate verification unit configured to receive, from the server, a certificate for deleting the history information recorded in the battery history data, and verify that the certificate is correct, wherein when the certificate verification unit verifies that the certificate is correct, the certificate verification unit is configured to cause the history upload control unit to delete the history information.

2. The battery history information management device according to claim 1, further comprising:

a charge/discharge threshold determination unit configured to determine whether or not a charge/discharge integrated value exceeds a predetermined threshold, the charge/discharge integrated value being an integrated value of one of the following: the number of times of charge; the number of times of discharge; the number of times of charge-and-discharge; an amount of charge; an amount of discharge; and an amount of charge-and-discharge, for the secondary battery, which is indicated by the charge/discharge history which is history of charge or discharge to or from the secondary battery performed by the second charge/discharge device recorded in the battery history data; and a penalty execution unit configured to execute, when it is determined that the charge/discharge integrated value exceeds the threshold, a penalty operation including limiting charging or discharging to or from the secondary battery or issuing an alert.

3. The battery history information management device according to claim 2, wherein the penalty execution unit is configured to execute, when it is determined that the charge/discharge integrated value exceeds the threshold, the penalty operation at a next charge or discharge to or from the secondary battery performed by the second charge/discharge device.

4. The battery history information management device according to claim 2, further comprising:

an alert execution unit configured to issue an alert when a difference between the charge/discharge integrated value and the threshold is smaller than or equal to a predetermined value.

5. The battery history information management device according to claim 2, wherein the charge/discharge threshold determination unit is configured to: increase the threshold when the history upload control unit transmits the battery history data to the server; and determine whether or not the charge-and-discharge integrated value exceeds the threshold increased.

6. The battery history information management device according to claim 2, further comprising:

a storage unit configured to store registered charge/discharge device data indicating a registered charge/discharge device that is the second charge/discharge device previously registered; and a registered charge/discharge determination unit configured to determine, when it is determined that the charge/discharge device is the second charge/discharge device, whether the second charge/discharge device is the registered charge/discharge device or an unregistered charge/discharge device which is not the registered charge/discharge device, with reference to the registered charge/discharge device data, wherein the charge/discharge threshold determination unit is configured to: determine, when it is determined that the second charge/discharge device is the registered charge/discharge device, whether or not the charge/discharge integrated value for the registered charge/discharge device exceeds a predetermined first threshold; and determine, when it is determined that the second charge/discharge device is the unregistered charge/discharge device, whether or not the charge/discharge integrated value for the unregistered charge/discharge device exceeds a predetermined second threshold smaller than the first threshold, and the penalty execution unit is configured to execute the penalty operation (i) when it is determined that the charge/discharge integrated value for the registered charge/discharge device exceeds the first threshold or (ii) when it is determined that the charge/discharge integrated value for the unregistered charge/discharge device exceeds the second threshold.

7. The battery history information management device according to claim 6, wherein the storage unit is configured to store registered charge/discharge history data and unregistered charge/discharge history data, the registered charge/discharge history data indicating the registered charge/discharge history which is history of charge or discharge to or from the secondary battery performed by the registered charge/discharge device, and the unregistered charge/discharge history data indicating the unregistered charge/discharge history which is history of charge or discharge to or from the secondary battery performed by the unregistered charge/discharge device, the registered charge/discharge determination unit is configured to: accumulate, when the registered charge/discharge determination unit determines that the second charge/discharge device is the registered charge/discharge device, the history of charge or discharge to or from the secondary battery performed by the registered charge/discharge device, in the registered charge/discharge history data; and accumulate, when the registered charge/discharge determination unit determines that the second charge/discharge device is the unregistered charge/discharge device, the history of charge or discharge to or from the secondary battery performed by the unregistered charge/discharge device, in the unregistered charge/discharge history data, and the charge/discharge threshold determination unit is configured to: determine whether or not the charge/discharge integrated value indicated by the registered charge/discharge history data exceeds the first threshold; and determine whether or not the charge/discharge integrated value indicated by the unregistered charge/discharge history data exceeds the second threshold.

8. The battery history information management device according to claim 6, wherein the storage unit is configured to store the registered charge/discharge device data including position information of the registered charge/discharge device, and the registered charge/discharge determination unit is configured to determine whether the second charge/discharge device is the registered charge/discharge device or the unregistered charge/discharge device, using the position information included in the registered charge/discharge device data and position information of the secondary battery connected to the second charge/discharge device.

9. A power storage device comprising:
a secondary battery; and
the battery history information management device according to claim 1, for managing the history information of the secondary battery.

10. A battery history information management system comprising:
the battery history information management device according to claim 1;
the server which manages the history information; and
the first charge/discharge device connected to the server via the communication network.

11. The battery history information management device according to claim 1,
wherein the server is further configured to bind a battery ID of the secondary battery to reset information which is for deleting the history information recorded in the battery history data,
generate a signature, and
transmit the signature to the certificate verification unit, and
the certificate verification unit is further configured to receive the signature, and verify that the certificate is correct based on the signature.

12. A battery history information management method of managing history information indicating charge history or discharge history of a secondary battery, the method comprising:
determining whether a charge/discharge device connected to the secondary battery for charging or discharging the secondary battery is a first charge/discharge device or a second charge/discharge device, the first charge/discharge device being connected via a communication network to a server which manages the history information, and the second charge/discharge device not being connected to the server;
recording, when it is determined that the charge/discharge device is the second charge/discharge device, charge/discharge history into battery history data for recording the history information, the charge/discharge history being history of charge or discharge to or from the secondary battery performed by the second charge/discharge device;
transmitting, when it is determined that the charge/discharge device is the first charge/discharge device, the battery history data recorded with the history information to the server via the first charge/discharge device;
receiving, from the server, a certificate for deleting the history information recorded in the battery history data;
verifying that the certificate is correct; and
deleting, when the certificate is verified as correct in the verifying, the history information.

13. A program recorded on a non-transitory computer-readable recording medium, the program being for causing a computer to execute the battery history information management method according to claim 12.

14. A non-transitory computer-readable recording medium on which the program according to claim 13 is recorded.

* * * * *